US009292827B2

(12) United States Patent
Musa et al.

(10) Patent No.: US 9,292,827 B2
(45) Date of Patent: Mar. 22, 2016

(54) ALCOHOLIC BEVERAGE ALLOCATION MACHINE

(75) Inventors: John A. Musa, Fort Collins, CO (US); Gary N. Hall, Tucson, AZ (US)

(73) Assignee: Rain Effect, LLC, Bellvue, CO (US)

( * ) Notice: Subject to any disclaimer, the term of this patent is extended or adjusted under 35 U.S.C. 154(b) by 0 days.

(21) Appl. No.: 13/399,886

(22) Filed: Feb. 17, 2012
(Under 37 CFR 1.47)

(65) Prior Publication Data

US 2012/0150674 A1 Jun. 14, 2012

Related U.S. Application Data

(63) Continuation of application No. 11/919,285, filed as application No. PCT/US2006/015965 on Apr. 24, 2006, now abandoned.

(60) Provisional application No. 60/674,353, filed on Apr. 23, 2005.

(51) Int. Cl.
| | |
|---|---|
| *A01K 5/02* | (2006.01) |
| *G06F 17/50* | (2006.01) |
| *G06Q 10/08* | (2012.01) |
| *G06Q 20/20* | (2012.01) |
| *G06Q 30/02* | (2012.01) |
| *G06Q 40/00* | (2012.01) |

(52) U.S. Cl.
CPC .......... *G06Q 10/087* (2013.01); *G06Q 10/0875* (2013.01); *G06Q 20/203* (2013.01); *G06Q 30/02* (2013.01); *G06Q 30/0283* (2013.01); *G06Q 40/12* (2013.12)

(58) Field of Classification Search
None
See application file for complete search history.

(56) References Cited

U.S. PATENT DOCUMENTS

| | | |
|---|---|---|
| 5,224,034 A | 6/1993 | Katz et al. |
| 5,237,496 A | 8/1993 | Kagami et al. |
| 5,244,034 A | 9/1993 | Yamada et al. |
| 5,299,115 A * | 3/1994 | Fields et al. ................. 705/7.22 |
| 5,381,517 A * | 1/1995 | Thorndike et al. .............. 706/52 |
| 5,400,253 A | 3/1995 | O'Connor |

(Continued)

FOREIGN PATENT DOCUMENTS

WO          2006116573 A2    11/2006

OTHER PUBLICATIONS

International Patent No. PCT/US06/15965, International Report on Patentability dated Nov. 15, 2007.

(Continued)

*Primary Examiner* — Ryan Zeender
*Assistant Examiner* — Christopher Buchanan
(74) *Attorney, Agent, or Firm* — Santangelo Law Offices, P.C.

(57) ABSTRACT

Various methods and systems such as in a software application are presented which may include automated purchase recommendations based on amalgamated purchase constraints (4) for business inventory maintenance, notation of events through noted event entry portals (31) for business related observation recordation, automatic facilitation of regular debut of initial suggested industry tied information (50), presentation of business performance data (65) and disparate substantially redundant business performance data (67) in a business performance display (66) for a summary review of business operations, and easy selection of inventory items (83) from a recommended hierarchical categorization of inventory items which may be used to create buying reports, ad hoc reports, and the like.

11 Claims, 23 Drawing Sheets

(56) References Cited

U.S. PATENT DOCUMENTS

| | | | |
|---|---|---|---|
| 5,450,317 A * | 9/1995 | Lu et al. | 705/7.24 |
| 5,596,493 A | 1/1997 | Tone et al. | |
| 5,608,621 A | 3/1997 | Caveney et al. | |
| D388,776 S | 1/1998 | Zhang et al. | |
| 5,765,143 A * | 6/1998 | Sheldon et al. | 705/28 |
| 5,771,172 A * | 6/1998 | Yamamoto et al. | 700/106 |
| D402,283 S | 12/1998 | Anderson et al. | |
| 5,963,919 A | 10/1999 | Brinkley et al. | |
| 6,078,900 A | 6/2000 | Ettl et al. | |
| 6,341,269 B1 * | 1/2002 | Dulaney et al. | 705/22 |
| 6,341,271 B1 | 1/2002 | Salvo et al. | |
| 6,470,324 B1 * | 10/2002 | Brown et al. | 705/28 |
| 6,609,101 B1 | 8/2003 | Landvater | |
| 6,711,550 B1 * | 3/2004 | Lewis et al. | 705/7.31 |
| D504,440 S | 4/2005 | Luquet | |
| 6,978,249 B1 | 12/2005 | Beyer et al. | |
| 7,003,474 B2 | 2/2006 | Lidow | |
| 7,043,457 B1 | 5/2006 | Hansen | |
| D538,817 S | 3/2007 | Noviello et al. | |
| D539,807 S | 4/2007 | Noviello et al. | |
| D549,717 S | 8/2007 | Noviello et al. | |
| D552,617 S | 10/2007 | Noviello et al. | |
| D553,140 S | 10/2007 | Noviello et al. | |
| D554,653 S | 11/2007 | Noviello et al. | |
| D558,213 S | 12/2007 | Noviello et al. | |
| D559,259 S | 1/2008 | Noviello et al. | |
| D559,260 S | 1/2008 | Noviello et al. | |
| 7,320,108 B2 | 1/2008 | Hough et al. | |
| D562,837 S | 2/2008 | Blencowe | |
| D567,251 S | 4/2008 | Sadler | |
| D569,869 S | 5/2008 | Chotai et al. | |
| D572,717 S | 7/2008 | Loehr et al. | |
| 7,565,620 B1 | 7/2009 | Kershaw et al. | |
| D606,090 S | 12/2009 | Danton | |
| D625,320 S | 10/2010 | Woods et al. | |
| D649,973 S | 12/2011 | Matas | |
| D660,862 S | 5/2012 | Anzures et al. | |
| D660,864 S | 5/2012 | Anzures et al. | |
| 8,176,436 B2 | 5/2012 | Arend et al. | |
| D665,815 S | 8/2012 | Kobayashi | |
| D665,816 S | 8/2012 | Kobayashi | |
| D675,633 S | 2/2013 | Goldstein et al. | |
| D675,634 S | 2/2013 | Goldstein et al. | |
| D675,635 S | 2/2013 | Goldstein et al. | |
| D675,636 S | 2/2013 | Goldstein et al. | |
| D678,309 S | 3/2013 | Kobayashi | |
| D679,285 S | 4/2013 | Stidsen | |
| D681,650 S | 5/2013 | Fletcher et al. | |
| D688,257 S | 8/2013 | Talbot et al. | |
| D688,681 S | 8/2013 | Talbot et al. | |
| D688,682 S | 8/2013 | Talbot et al. | |
| D688,686 S | 8/2013 | Rhee et al. | |
| D705,236 S | 5/2014 | Noda et al. | |
| 2002/0091562 A1 * | 7/2002 | Siegel et al. | 705/10 |
| 2002/0161674 A1 | 10/2002 | Scheer | |
| 2002/0178077 A1 | 11/2002 | Katz et al. | |
| 2003/0028437 A1 | 2/2003 | Grant et al. | |
| 2003/0083947 A1 * | 5/2003 | Hoffman et al. | 705/22 |
| 2003/0115113 A1 | 6/2003 | Duncan | |
| 2003/0144938 A1 * | 7/2003 | Lahre et al. | 705/36 |
| 2003/0195791 A1 | 10/2003 | Waller et al. | |
| 2003/0216969 A1 | 11/2003 | Bauer et al. | |
| 2004/0172321 A1 * | 9/2004 | Vemula et al. | 705/8 |
| 2004/0220861 A1 * | 11/2004 | Morciniec et al. | 705/26 |
| 2005/0137944 A1 * | 6/2005 | Lu | 705/28 |
| 2005/0216371 A1 | 9/2005 | Fotteler et al. | |
| 2006/0015425 A1 | 1/2006 | Brooks | |
| 2006/0036476 A1 * | 2/2006 | Klem | 705/7 |
| 2009/0063305 A1 * | 3/2009 | Kreifels et al. | 705/28 |
| 2010/0070333 A1 | 3/2010 | Musa et al. | |

OTHER PUBLICATIONS

CAM Commerce Solutions; Retail STAR Software, believed to be at least as of Mar. 2004 (9 pages).

Violino, Bob; Microsoft Executive Circle Print, Smarter Operations Through Retail Analytics; printed Apr. 5, 2005 (2 pages).

U.S. Appl. No. 60/674,353, filed Apr. 23, 2005, entitled "Simplified Vendor Order System for Enhanced Inventory Management" (25 pages).

PCT/US06/15965 Search Report and Written Opinion (4 pages).

U.S. Appl. No. 11/919,285, filed Oct. 23, 2007, entitled Enhanced Business and Inventory Management Systems.

Design U.S. Appl. No. 29/432,407, Office Action dated Aug. 18, 2014, 9 pages.

India Patent Application No. 4406/KOLNP/2007, Office Action dated Jun. 4, 2014, 2 pages.

* cited by examiner

ALCOHOLIC BEVERAGE ALLOCATION MACHINE

CROSS-REFERENCE TO RELATED APPLICATIONS

This application is a continuation of U.S. application Ser. No. 11/919,285, filed Oct. 23, 2007, which is the United States National Stage of International Application No. PCT/US2006/015965, filed Apr. 24, 2006, which claims the benefit of and priority to U.S. Provisional Application No. 60/674,353, filed Apr. 23, 2005, each hereby incorporated by reference. Any priority case is hereby incorporated by reference herein.

TECHNICAL FIELD

The invention provides business intelligent software in small retail business environments without large IT departments and large capital investments. Embodiments of the invention may allow for a variety of functions, including: accurate sales analysis, real time trends, vendor analysis, departmental analysis and other easy-to-use methods to facilitate the making of quick, profitable, solid business decisions and to facilitate various day-to-day business operations. Embodiments of the invention may adapt easily to existing or pre-existing point-of-sale (POS) data collection systems already in use by many retailers. The invention may even enhance POS data information by analyzing it and presenting it in simplified conclusive manners. It may enhance retailers and wholesalers in their supplier negotiations by leveling the playing field through proper product intelligence and can also enhance the economic viability of a retail or wholesale business.

BACKGROUND OF THE INVENTION

Many facets of business involve providing goods to others. Retailers may provide these to their customers as end users of the goods. Wholesalers may provide goods to others in the supply chain. Regardless, each provider needs to assure they have adequate supplies on hand to avoid loosing a sale to the customer who often "needs it now." Of course, inventory usually costs money, usually requires space, and may even require manpower in some manner. For these reasons, there is a competing goal of minimizing the amount of inventory on hand at any given time. With a focus on the immediacy offered by immediate communication and overnight delivery it has often appeared that the focus of proper business management and inventory control has been on utilizing an immediate delivery option rather than giving a greater degree of attention to intelligent management of the inventory amounts themselves. As its name reflects, the concept of "Just in Time" delivery may even be seen as a reflection of a focus more on the speed of delivery rather than an intelligent handling of the inventory allocations themselves. It may even be that a problem has been a diversion of attention away from an independent management of the inventory to an acceptance of guidance from a supplier or salesman who often assists in suggesting and guiding the management of the inventory itself through application of their impressions and experience in the particular industry to which they supply their particular goods. Unfortunately, this experience may or may not be applicable. In fact, in some industries, variations in consumer behaviors can exist on a microeconomic level. For example, using the liquor industry as but one example, the suppliers' experiences and impressions gleaned from sales to retailers having a residential consumer base in one part of a town can vary dramatically—and have little applicability—to a retailer in the same industry having a college or university consumer base. Surprisingly, this can exist even though the two retailers are but a mile or two apart. Thus, the guidance offered by the salesperson for the supplier may be completely inapplicable. This can even exist without the salesperson being aware of it, for often the two types of retailers are perceived as having similar characteristics. Thus, what may be needed may be an ability for individual retailers and wholesalers to have their own information base and their own knowledge of their own consumer base from which to make informed decisions. Importantly this may need to be presented in a simplistic and useful manner for actual users—often managers of individual departments of the small retailer.

There are a variety of systems available to make these systems, of course. Other than those focusing on the Just in Time aspects, systems seem to focus on the mathematical or other precise nature of the information available rather than its simplicity of use. For this example, U.S. Pat. No. 6,341,271 entitled "Inventory Management System" discloses an approach which focuses on a system that senses and calculates appropriate inventory levels. As can be understood, this approach is not one that lends itself to the simplicity needed for use by a small retailer or the like. U.S. Pat. No. 5,237,496 entitled "Inventory Control Method and System" discloses an approach that focuses on a system applied to a department store of the like that provides warnings on diversions from what is appropriate as determined from computations. It acknowledges the challenges of over dependence on the relationship and a reliance on the maker or wholesaler of the goods involved. Again, it is believed that this approach has complexity that does not lend itself to the simplicity needed for use by a small retailer or the like and its complexity may even deter use of the system by a small retailer. U.S. Pat. No. 5,765,143 entitled "Method and System for Inventory Management" discloses an approach applied to an automobile parts industry that focuses on a system that applies actuarial data and perhaps statistical algorithms to achieve accurate inventory management. Again, this approach is also not one that lends itself to the simplicity needed for use by a small retailer or the like. Other patents using a level of complexity perhaps not seen as appropriate include U.S. Pat. No. 5,596,493, U.S. Pat. No. 5,608,621, U.S. Pat. No. 5,963,919, U.S. Pat. No. 6,341,269, U.S. Pat. No. 6,470,324, and U.S. Pat. No. 6,609,101. Again, each appear overly complex and do not facilitate an integration with an existing or pre-existing POS system to the degree contemplated by embodiments of the present invention. This can be especially desirable when conducting efforts to determine an appropriate amount to order given consumer and supplier environments that can change on a spur of the moment or with little notice. Existing systems simply fail to provide a proper balance that allows a small retailer to enhance its vendor partnerships, to help actually achieve capital preservation, and of course, to provide superior customer service by trying to not be out of a customer's favorites at any point in time.

DISCLOSURE OF THE INVENTION

Accordingly, the invention provides various embodiments that can be implemented either alone or in combinations to achieve a variety of goals. Some of these goals include, but are not limited to, reducing the amount of time necessary to manage inventory balances, providing a systems that can facilitate identifying trends in the small retailer environment without a significantly complicated, costly, or time consuming effort, identifying trends and noted events that may quickly enhance profitability and create a stable capital investment model, and even such far reaching goals of simply equipping the retailer or wholesaler with information that may enhance its negotiation position as it deals with a manufacturer or supplier representative or salesman. In this regard, it may be helpful to understand that vendor relationships are often misleading. Vendors tend to evaluate retailers from the standpoint of what the retailer purchases. Over inventory of items purchased, under inventory of items and profitability of the retailer is often not the vendor focus. Retailers may actually experience trends well in advance of vendor information. With some of the embodiments of the present invention, retailers may be proactive in responding to trends and profitability by identifying market shifts early and using these shifts to their advantage when dealing with vendors. Retailers can level the playing field with vendors by supplying vendors with information on a real-time basis and can allow the vendor to respond to this information in a manner that is positive to enhance the partnership. The response might be as simple as establishing new price points, reducing deal levels to achieve lower price points, or vendors taking a more active role in POS materials used to promote their products within the retail store. Vendors should work as hard as the retailer to enhance the partnership that exists with the retailer and this invention can be a valuable tool to assure that this happens. With this invention, the retailer can establish that he is the customer and can enhance negotiations based on what is best for their business. As to goals of the invention in general, it may also be understood that balancing inventory levels can sometimes be a significant challenge for experienced and beginning retailers. Proper inventory balance can even be a significant factor that might undermine the economic viability of a particular retail business. The components that may affect balance are quantity on hand, sell through, which price points sell best, retail price, shelf position and current real time trends. Each of these can affect overall profitability, inventory balance, ROI and the positive or negative use of the retailer's capital, not to mention the affect they can have on keeping the customer base satisfied to continue the relationship with each customer.

BRIEF DESCRIPTION OF THE DRAWINGS

FIG. 2 is an example of one screen display that illustrates a buying report functionality and elements which may contain numerical data; headings; item description; percentages; values corresponding to number of units, percentage mixture, per day numbers, units, cases, year to date trends, case order, deal number, cost, retail, and percentage gross margin; and the like.

FIG. 3 is an alternative example of FIG. 2 one screen display that illustrates a buying report functionality and elements which may contain numerical data; headings; item description; percentages; values corresponding to number of units, percentage mixture, per day numbers, units, cases, year to date trends, case order, deal number, cost, retail, and percentage gross margin; and the like.

FIG. 4 is an example of one screen display that illustrates a deal tracking functionality and element which may contain numerical data; headings; text; values corresponding to quantity; end dates; size; cost; deal dates; text corresponding to vendors, brand, deal notes, item, remaining buy on deal, and total buy to date; and the like.

FIG. 7 is an example of one screen display that illustrates a noted event functionality and elements which may contain headings, dates, noted event description and the like.

FIG. 8 is an example of one screen display that illustrates categorization of a noted event functionality and elements which may contain headings, categories, text and the like.

FIG. 9 is an example of one screen display that illustrates a morning report functionality and elements which may contain numerical data; headings; values corresponding to customers, average purchase, gross sales, gross profits, and percentage gross profits; and the like.

FIG. 12 is an example of one screen display that illustrates business performance functionality and elements which may contain numerical data; headings; values corresponding to sales, customers, average purchase, first quarter values, second quarter values, third quarter values, fourth quarter values, and total year values; text corresponding to notes, first quarter notes, second quarter notes, third quarter notes, fourth quarter notes, and annual notes; and the like.

FIG. 13 is an alternative example of one screen display that illustrates business performance functionality and elements which may contain numerical data; headings; values corresponding to sales, customers, average purchase, and monthly values; text corresponding to notes and monthly notes; and the like.

FIG. 14 is an alternative example of one screen display that illustrates business performance functionality and elements which may contain numerical data; headings; values corresponding to sales, customers, average purchase, and weekly values; text corresponding to notes, and weekly notes; and the like.

FIG. 15 is an example of one screen display that illustrates both the functionality and elements through which an embodiment of the system can isolate particular products for eventual analysis which may contain headings; text; dates; text corresponding to location, code, category, style type, country, region, department, vendor, inventory item, unit size, pack size, container, alternative description, start date, prior start date, end date, and prior end date; and the like.

FIG. 16 as an alternative example of FIG. 15 of one screen display that illustrates both the functionality and elements through which an embodiment of the system can isolate particular products for eventual analysis.

FIG. 17 is an example of one screen display that illustrates both the functionality and elements through which an embodiment of the system can create an "Ad Hoc" report which may contain headings; text; dates; text corresponding to general selections, month to date selections, year to date selections, date range selections, item number, and description; and the like.

FIG. 19 is an example of one screen display that illustrates an "Ad Hoc" report functionality and element which may contain numerical data; headings; values corresponding to item number, cost, retail, percentage gross margin, month to date costs, month to date sales, month to date gross margin percentage, year to date cost, year to date sales, and year to date gross margin percentage; description text; and the like.

FIG. 20A is an example of one screen display that illustrates a simplified date alteration functionality and element which may contain numerical data; headings; text; and the like.

FIG. 20B is an example of one screen display that illustrates a simplified date alteration functionality and element which may contain numerical data; headings; text; and the like.

FIG. 21 is an example of one screen display that illustrates a product drill down and graphing functionality and element which may contain numerical data; headings; text; and the like.

FIG. 22 is an example of one screen display that illustrates both the functionality and elements through which an embodiment of the system can create 12-month trends which may contain numerical data; text; and the like.

FIG. 23 is an example of one screen display that illustrates both the functionality and elements through which an embodiment of the system can create recap data which may contain numerical data; text; and the like.

MODE(S) FOR CARRYING OUT THE INVENTION

As mentioned earlier, the present invention includes a variety of aspects, which may be combined in different ways. The following descriptions are provided to list functions and elements, and to describe some of the embodiments of the present invention. Elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In general, the invention may include methods for business operation and business operations systems which can provide information systems perhaps even software programs to facilitate effective business management. Some systems may include, but is not limited to the inventory systems, business sales systems, business sales information systems, business information systems, automated systems, and the like. It is noted that while specific examples discussed in this application may relate to liquor store applications, the various embodiments herein can be applied to other applications such as other markets, businesses, retail, wholesale, grocery stores, clothing stores, luggage stores, party stores, automobile accessory stores, winerys, gift stores, bicycle stores, and the like and all are meant to be included in this disclosure.

In embodiments, the invention may include functionality to permit a retailer or wholesaler to order optimal or perhaps just more advantageous quantities of particular goods based on specific purchasing combinations. For example, a supplier may offer quantity discounts for a collection of items supplied by that particular vendor or vendor's business. Illustrating this aspect in a liquor store application, it can be seen that one example may be that a supplier of a variety of wine brands, varietals, sizes or the like may offer a discount for a total order quantity, such as 100 cases. Through one software functionality, the retailer using this facet of the software may be able to determine an optimal mix of ordering. By entering the deal size, the software may compute an order based on varietal, size, and/or sales mix from the data available to it. This data may include existing inventory, historical consumption, and products offered.

Figure 1:
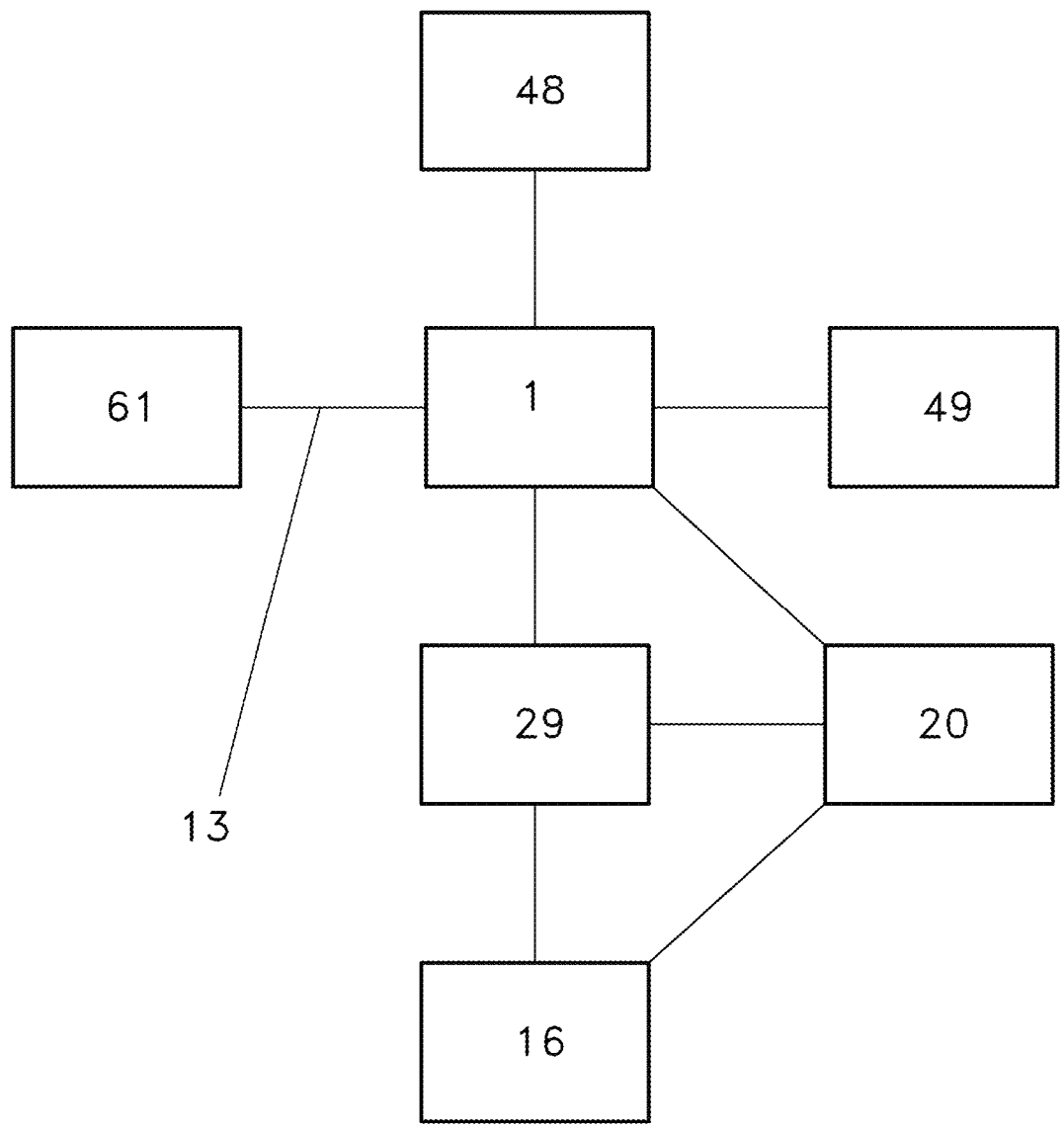
FIG. 1 illustrates schematically one design of an embodiment of the system at both an apparatus and functional level.

Referring to FIG. 1, this functionality can be further understood schematically. In this figure, it can be seen that the software may first accept an input from existing, and perhaps external point-of-sale systems such as a POS data collection system. This is shown conceptually as Box (61). In this embodiment there may even be a separately-provided system or data set. For example, other, perhaps previously existing, POS software or the like may simply output a standard file structure which may be linked (13) as input to the focused system of this embodiment. A link may even be accomplished via an internet or any other type of input such as simply reading a C, S, V tab-separated, or other structured file that represents a collection of previously generated data. Another input may also exist, for example that which provides the system with an understanding of the deal parameters offered by the supplier or the like. This may be automatically captured, however, since it is likely that this data is relatively spontaneous or real time (suppliers may not inform retailers of the deal available until they arrive at a retailer's location) it may be a very simple amount of data and perhaps even a single input such as a case quantity for a set percentage discount. Regardless of the format of input, this input is shown conceptually as Box (49) in FIG. 1. Once input, as may be understood, from Box (48), software may accomplish an initial calculation, use of various subroutines, use of various algorithms, and the like as shown conceptually in Box (1). The analysis may then provide an initial display as shown in Box (29). In other embodiments, a business information system may include additional displays as represented in Box (20). Displays may be interconnected or even responsive to each other such as when information may be displayed, entered, etc., in one display, that information may be linked, calculated, or even displayed in another display. From this a retailer responsible for ordering items may be able to assess the value of that initial display and may then determine variations appropriate to a more thorough or appropriate analysis. This may be accomplished by variation of analysis parameters such as various user input as shown in Box (48). Through this the retailer may alter any appropriate item to re-calculate values. For example, the retailer may choose to vary the date range for historical trend setting. Aspects of this function are discussed separately below. In one example a prior month's sales may be used. In another example a similar month one year prior might be used. A calculation may then be accomplished on that altered data. In this way seasonal trends or other temporal, recurring events may be accommodated in the analysis as each may change the way the supplier deal may be perceived and acted upon. Of course, output of information or analysis can be accomplished by storage or printing or the like. These are each to be understood as accommodated in the conceptual Box (16) shown in FIG. 1. Again, each if these may be accomplished by a computer implemented element or method such as illustrated. To reiterate with respect to the conceptual elements of FIG. 1, Box (61) may represent a point-of-sale system, a POS data input element or method, Box (49) may represent a user input entry element or method, for example supplier deal parameters entry element or method, Box (1) may represent an automated business information system such as an analysis element or functionality, Box (29) may represent a display element or functionality, Box (20) may represent additional display elements or functionalities, Box (48) may represent a user input element and analysis variance element or methods, and Box (16) may represent an output element or method. Through each of these elements or methods—whether separately created or implemented or not—embodiments of the invention may be able to achieve its goal of providing an order system or more generally business information systems that can easily identify and integrate spur of the moment or other purchase incentives offered by the vendor or perhaps even allow evaluation of the business.

Figure 15:
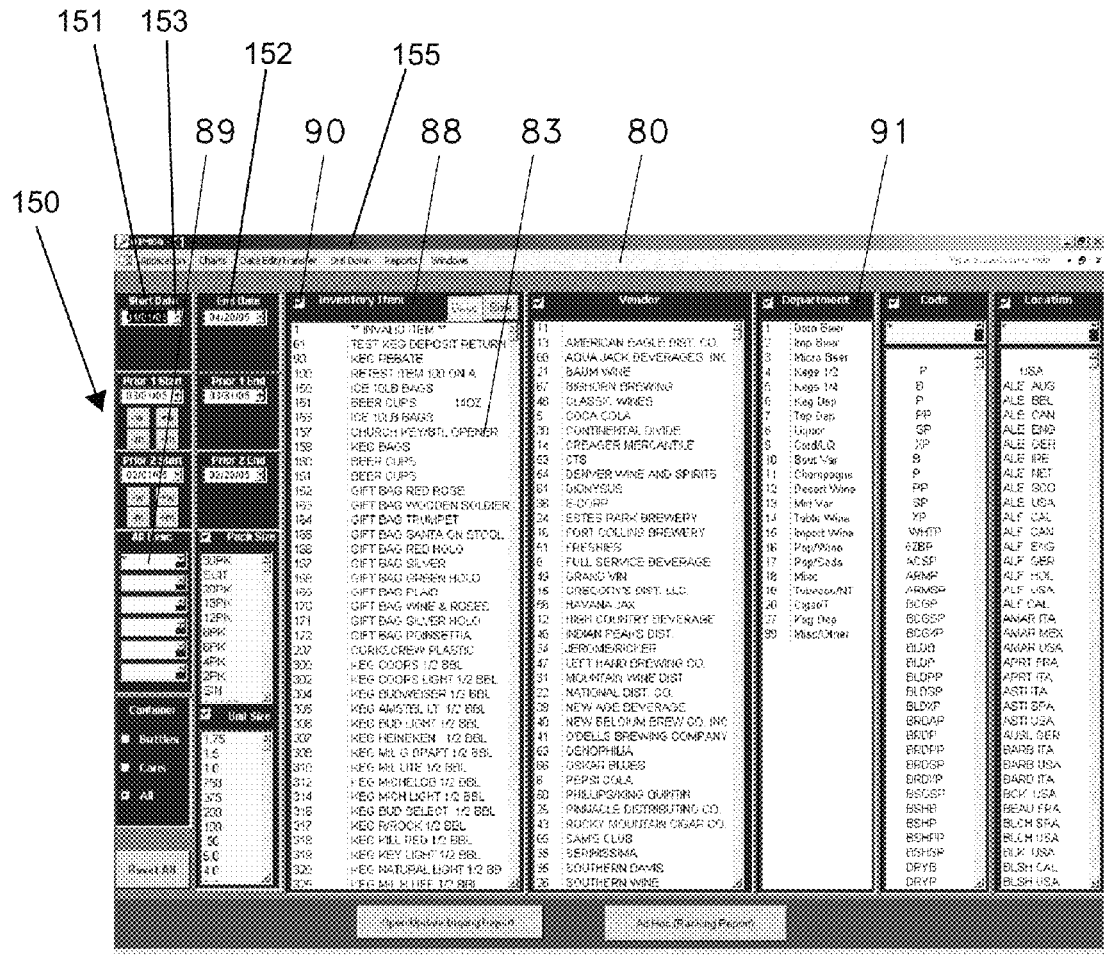

To understand operation, it can be seen in FIG. 15 that embodiments of the system may include database designation and can even isolate particular products for eventual analysis. In this example of a screen design (there, of course may be a great variety of screen displays according to the present invention), it can be understood that the system may provide presentation of an inventory category selection display (80) which may include listings by inventory item, vendor, department, code, and locations. In the cursed or related inventory system and inventory category selection display may include such items as pack size, unit size, container, and the like.

Figure 16:
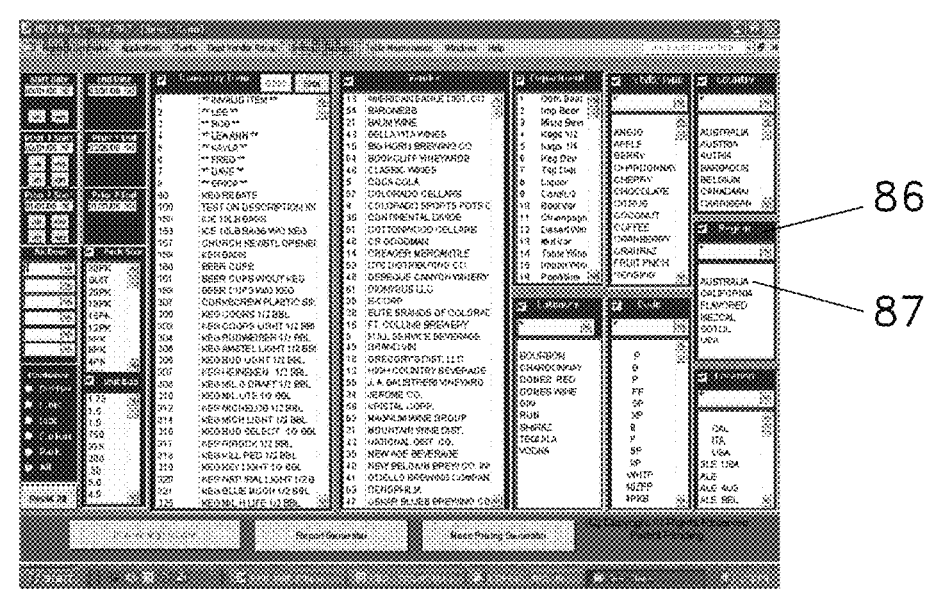

With respect to FIGS. 15 and 16, a business sales inventory system may recommend a hierarchical categorization of inventory items in a display which may allow for easy selection of inventory items (83). An inventory category selection display (80) may include a listing of inventory items (88), at least one inventory category (86) perhaps arranged in at least one stratum (91) having category items (87) listed therein. Selection of inventory items may be highlighted and input for analysis based upon user preference in a simple and intuitive manner by clicking on items as easily understood. As shown at the top of the inventory item column, buttons such as "Desc" and "Size" may be provided to permit sorting by alphabetic name of the item or size of item or the like with just one click. As such, a user may enter an alternative description of inventory items in an alternative description entry portal (89). By selection in another inventory category (such as represented in columns in FIG. 15), particular items may be displayed such as all those by a particular vendor, by a particular department (e.g., the top listed department "Dom Beer" or the like), by user preset product code (e.g., the top listed code "P" for premium, "B" for budget, or the like), or by user preset product source location (e.g., the top listed location "USA" for US beers or the like). In this regard, a key field may be an SKU identifier. In identifying products, maintaining a constant SKU through the life of a product may allow for this combining of current inventory and historical archived data. Through this, users can select the product mix desired for comparative analysis. As shown, columns can also be unclicked or unchecked to be removed from the grouping as well. For example, a single click inventory item selector (90) may be provided in an inventory category selection display (80) to allow single click selecting of inventory items displayed in an inventory items list. As suggested, an inventory category may include but is not limited to inventory item, vendor, department, category, style, type, code, country, region, location, pack size, unit size, container, alternative description, and the like categories. Of course, other categories may be appropriate with other business applications.

When a category item from an inventory category is selected, a system may automatically correlate the selected category item with the associated inventory items. Those associated inventory items may be responsive or perhaps even automatically responsive to the selected category item and may then be automatically displayed in an inventory item list. In other embodiments, when a category item is selected from an inventory category, category items in at least one additional inventory category may be affected by such selection. Therefore, a system may automatically correlate selected category items with category items in additional inventory category stratum. As a user selects a category item in each stratum of categories, a system may readily provide those related inventory items in an inventory item list thereby reducing the number of inventory items to a limited comprehensible list.

As discussed in more detail below, inventory items selected from an inventory category selection display may provide such selected inventory items in a buying report display as may be understood in FIG. 2. A buying report display may include inventory item purchase information such as but not limited to number of units sold, amalgamated purchase constraints, percentage mixture, per day averages, current data, current number of units sold, current percentage mixture, current per day averages, historical purchase data, historical monthly purchase data, prior monthly purchase data, prior monthly number of units sold, prior percentage mixture, prior monthly per day averages, 12 month trend, recapitulation data days of inventory, and the like. It may then be appropriate to analyze inventory item purchase information when determining a purchase order for at least one of inventory items.

Figure 20A:
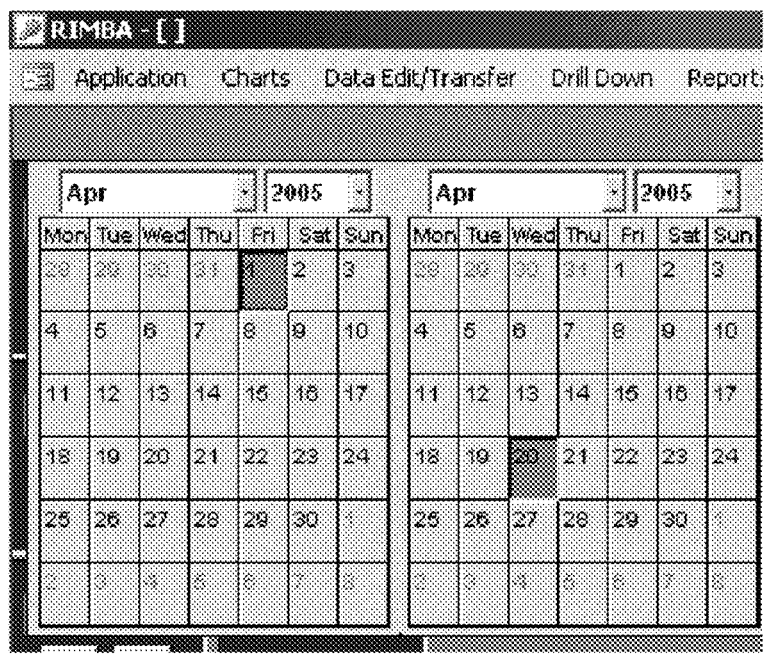
Figure 20B:
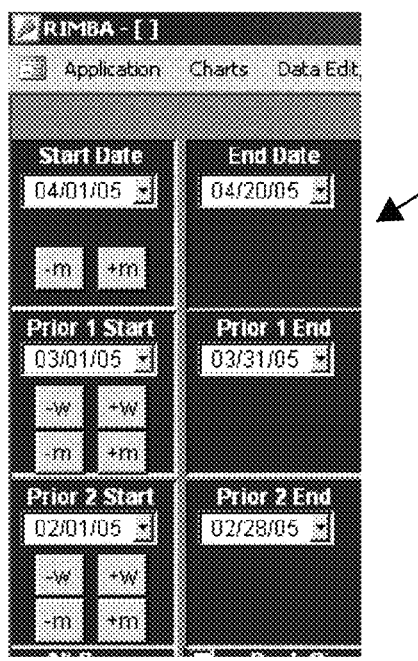

As also shown in this particular example, it can be understood that this and other embodiments can encompass functionality that can enhance user friendly aspects of the entire process. These embodiments may acknowledge and address the practical fact that for many retailers and wholesalers (the invention can apply equally to both), the manager, owner, or other person making the purchase decision may not have either the time, skill, or resources available to evaluate or use highly sophisticated or complex analysis or decision systems. Simplicity may even be paramount to permit actual usage of the system on an ongoing basis for the various people that may be hired or tasked with the ongoing and hopefully never ending inventory replenishment functions. As but one example of this type of functionality to highlight the significance of this approach, simple calendaring functions can be understood. In this aspect, it can be seen that with a "one click" calendar, the person involved can easily select appropriate time frames from one specific day, to a week, to a month to multiple years from which to conduct the analysis. While this may at first glance seem trivial, it should constantly be kept in mind that in the real retailing environment there can be turnover of management staff, there can be inadequate time to recall the process that occurred one or more months ago, and there can simply be other priorities and demands that cause the manager responsible for ordering not to be able to achieve an understanding or knowledge that may be necessary for a more complex system. Thus an important goal may be to have immediately intuitive and extremely simple processes that do not need to be re-learned each time a need a periodic need arises. This can be accomplished by a "one click" approach, namely, an approach through which immediate access to the format is provided with minimal or sometime no data entry needs by the user. One example can be seen in the one click calendar approach (150). As illustrated in FIGS. 15, 20A, and 20B, it can be seen that a user can be provided functionality through which starting and stopping analysis dates can be selected or even suggested. As shown in FIG. 15, start (151) and end dates (152) can be user set. Similarly, comparison dates (these are further explained in FIG. 2) can be set. In addition, as shown in FIG. 15, dates indicated as "Prior 1" and "Prior 2" can be easily altered to add a week ("+w"), subtract a week ("−w"), add a month ("+m"), or subtract a month ("−m") for simplified operation. Referring to FIGS. 20A and 20B, it can be understood that once a pull down date menu (153) is selected or clicked on, a display (157, 158) such as that shown in FIGS. 20A and 20B, respectively, can appear. Easy and importantly intuitive date selection can occur in this manner. As can also be understood, very specific options identifying appropriate starting and ending seasons, holidays, special events, dates, weather and other aspects could also be entered with actually or nearly "one click" as discussed later. The user can isolate any specific event that impacted sales positively or negatively and can conduct an analysis or review of the data for that period with little effort also as discussed in more detail later. With this calendar the user can even isolate items sold, sales in general and profitability for whatever time period chosen. With this calendar trends can be isolated and assessed by specific period, by specific vendor, by specific department profitability, by specific category, by specific class of product, or by other types of groupings. Importantly this can be accomplished simply and inexpensively and repetitively without need for an involved tutorial or other training of the user. As illustrated below the date settings in FIG. 15, it can be easily understood that product can be limited by a variety of categories beyond the five main columns shown. Specifically, as shown, pack size, unit size (e.g. the liter volume of a bottle or the like), container nature, or even an alternative description can be entered to set a selection of the products to be analyzed. This alternative description can even permit brand names (e.g., all Smirnoff products, etc), packaging subsets, or the like to be selected for analysis. Once entered, a buying report or perhaps even an "Ad Hoc" report can be provided with a simple click of the buttons shown at the bottom of this illustrative example. In embodiments, via the "Application" button shown at the top of the representative display of FIG. 15, pricing reports can be displayed and even printed as well. These are discussed later.

The system may act to allow the retailer to take the same product group of items being purchased and analyze them temporally to determine from the retailer's own experience what criteria best meets the current environment. By doing this the retailer may be able to establish a scenario where all the items within that product group can be depleted at the appropriate rate thus balancing inventory and maximizing the value of the purchase event to that particular retailer. The method may then capture the best mix scenario and may even automatically apply the numbers and generate the appropriate buy recommendation. A Buying report can be provided with a simple click of a button such as the "Buying Report" button shown at the bottom of the illustrative example of FIG. 15.

With respect to the creation of a buying report, embodiments of the system may include maintaining business inventory. As may be understood from FIG. 2, a system may automatically provide at least two inventory items (3) listed in an inventory item display (2). The inventory items may be selected from an inventory category selection display (80) as discussed herein. At least one or more automatically generated amalgamated purchase constraints (4) may be provided in an inventory item display. Automatic allocation of a purchase recommendation may include applying a selected percentage mixture to a purchase recommendation display. In addition, purchase data (11) of the inventory items may be provided in an inventory item display. Purchase data may include, but is not limited to number of units sold, amalgamated purchase constraints, percentage mixture, per day averages, current data, current number of units sold, current percentage mixture, current per day averages, historical purchase data, historical monthly purchase data, prior monthly purchase data, prior monthly number of units sold, prior percentage mixture, prior monthly per day averages, 12 month trend, recapitulation data, and the like. In embodiments, inventory data (12) may be displayed in a buying report display. Inventory data may include but is not limited to days of inventory, current days of inventory, average days of inventory, quantity of inventory, percentage mixture of inventory, trend percentages, trend data, previous cost, retail price, percent gross margin, and the like. To ensure all data in an inventory item display, such as a buying report display, or perhaps even an automated purchase recommendation display, contains current information, it may be desirable to update the information perhaps at least once per business day. This update may be done automatically or even manually. An inventory item information update element may include a link to a point-of-sale system or perhaps even an external point-of-sale system is discussed herein.

Figure 2:
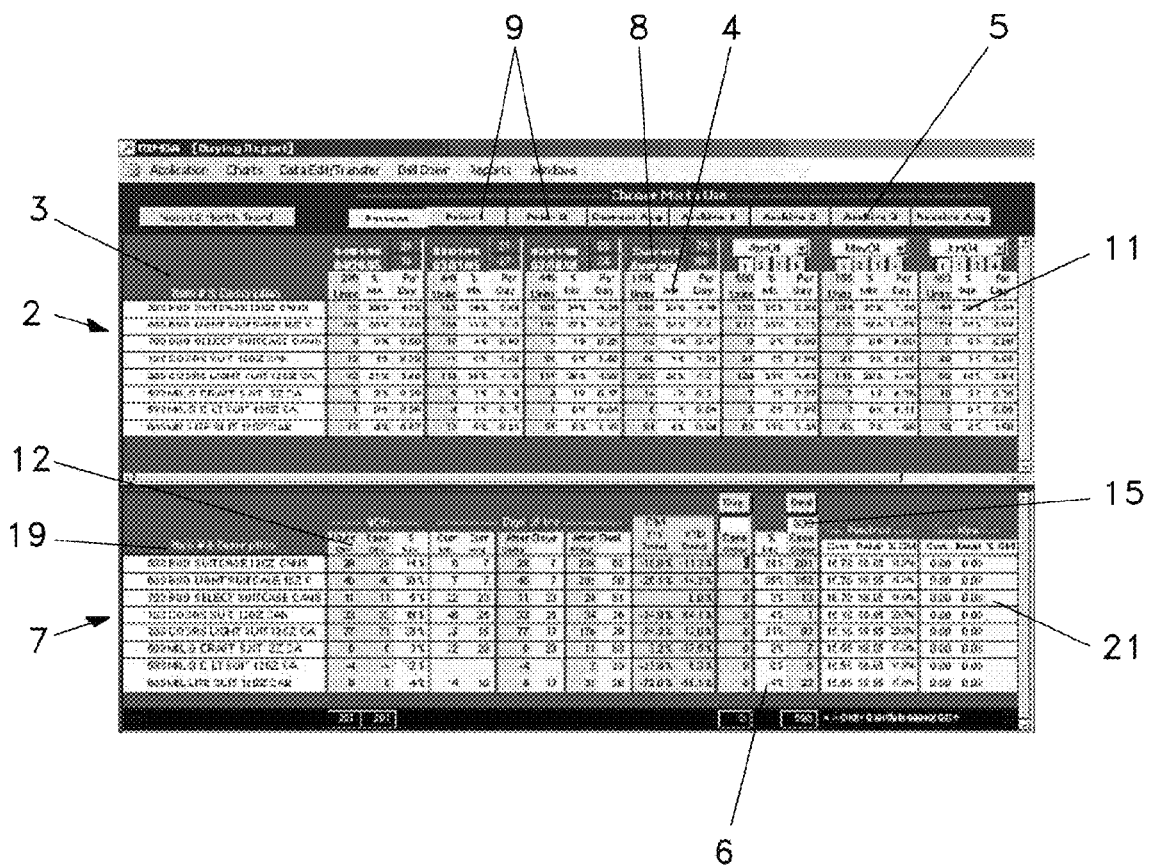
Figure 3:
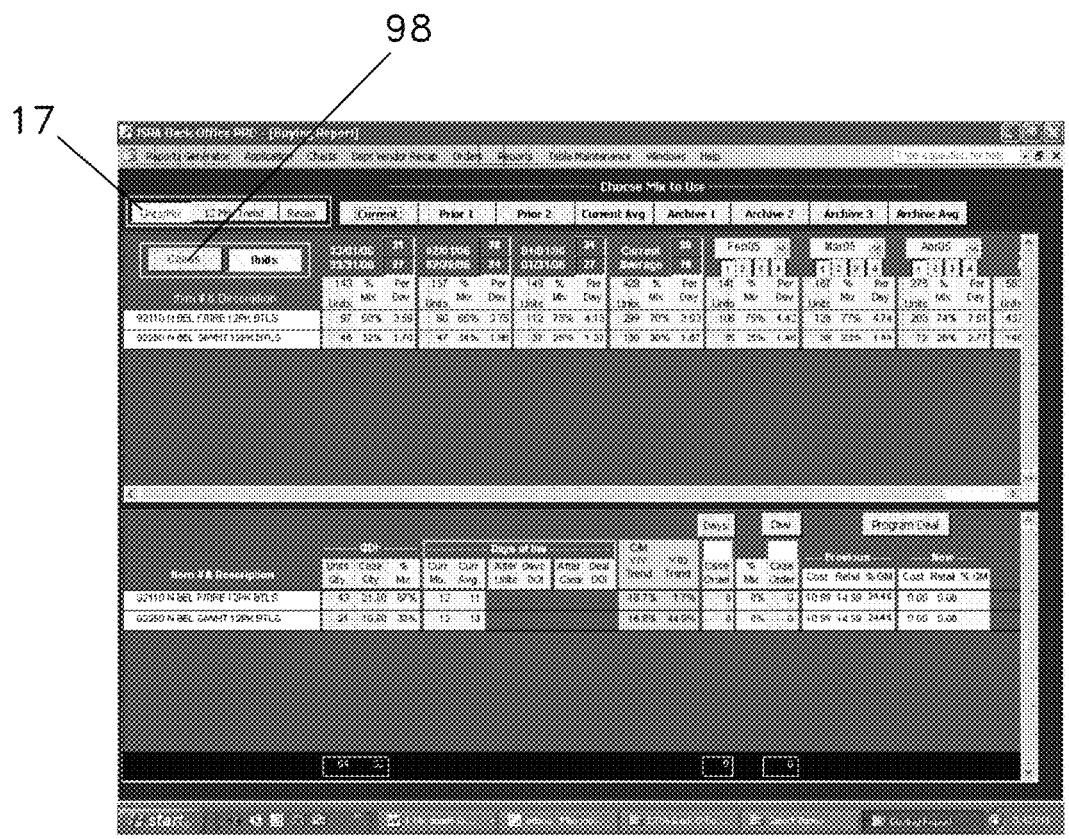
Figure 22:
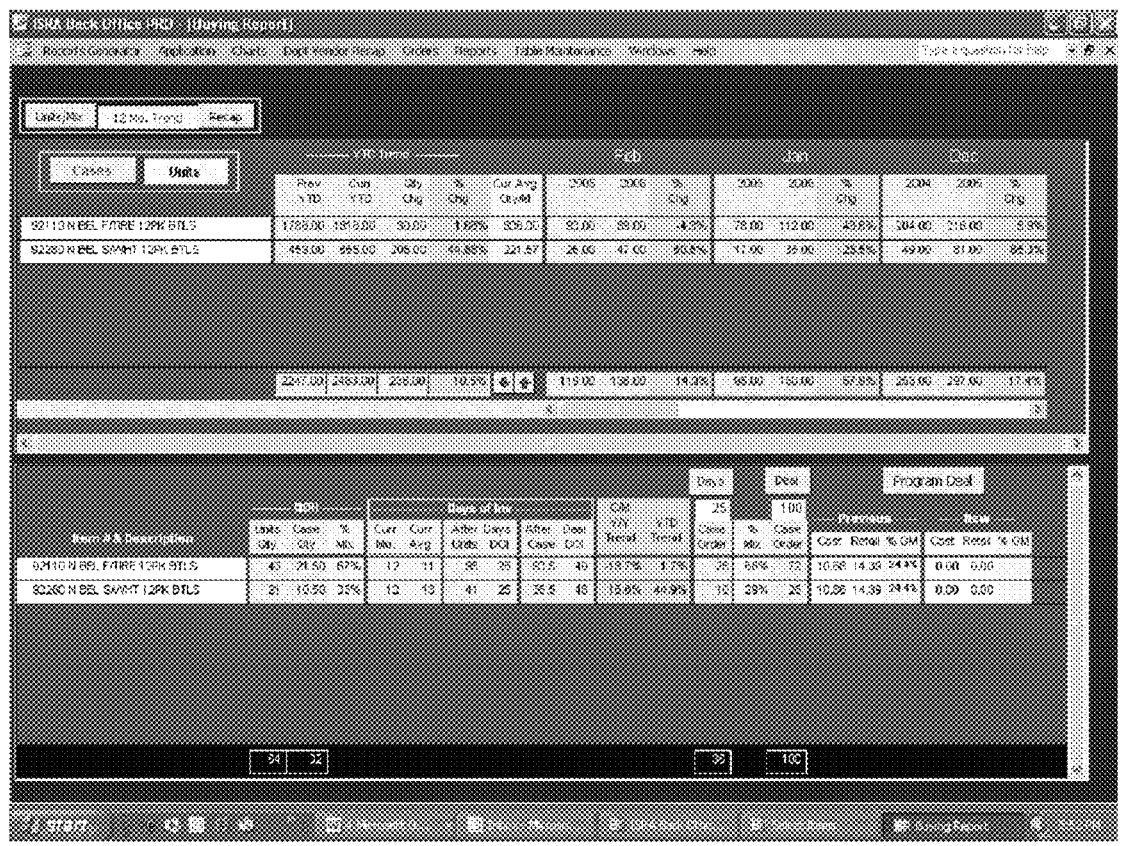
Figure 23:
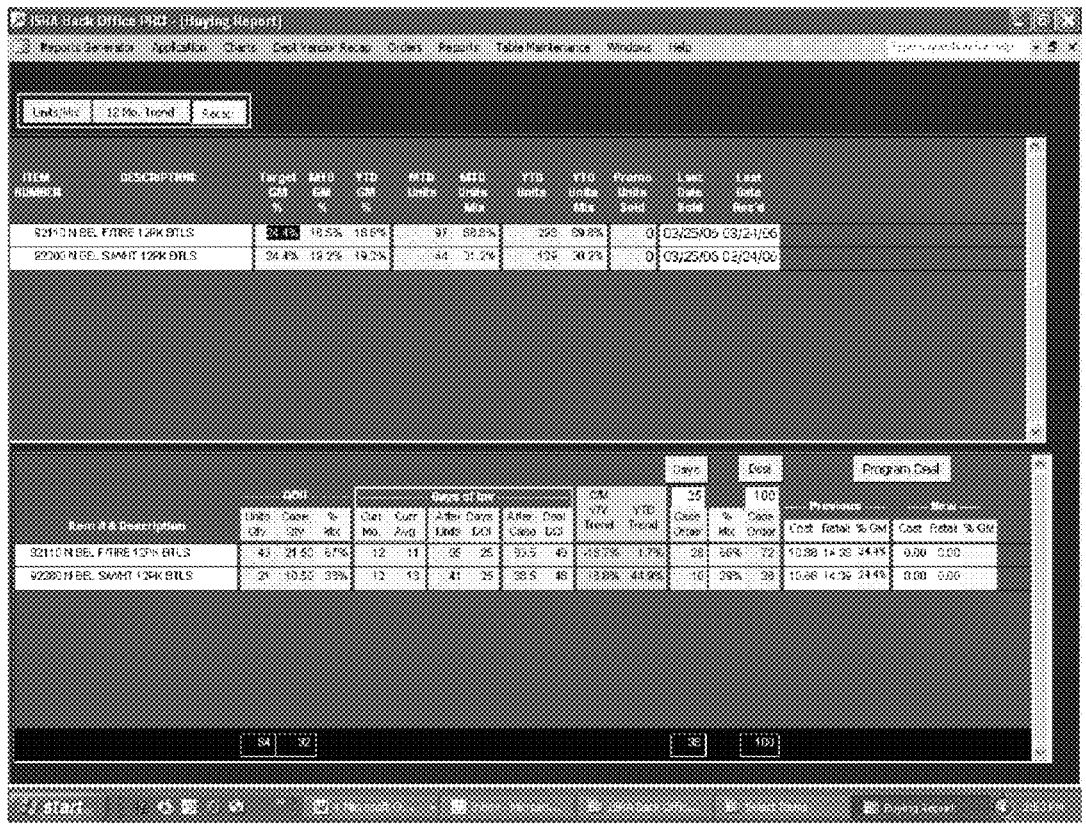

Once some type of buying report has been selected, information such as that shown in FIG. 2 may be displayed. As shown, the system can present a variety of comparison and historical data for the user to evaluate. Presentation of an amalgamated purchase constraint may include at least two amalgamated purchase constraints such as a current average amalgamated purchase constraint (8) (for example, as shown as current average in FIG. 2), and perhaps even at least one historical amalgamated purchase constraint (9) (for example, as shown as prior 1 and prior 2 in FIG. 2). Embodiments can default to suggested comparison and these can also be altered by the user. For example, a system may provide a default setting to select a current average amalgamated purchase constraint. Amalgamated purchase constraints may simply include a percentage mixture for the displayed inventory items. As illustrated, seven comparative sales periods can be displayed. A current period such as the present month to date (the date selected being indicated as Apr. 20, 2005 in this example) can be shown. Other periods or past months averages, and one year ago can also be shown. Within each of these, unit sales, percentage mix, daily sales or the like can be displayed for each product previously selected. In the lower half of the display, quantity on hand (QOH), days of inventory, current month ("C/M") trends and the like can be displayed. These may be based on only whole months performance to present more easily understood data. A user may be able to review the current and historical mixture data, inventory data, purchase data, and the like in order to determine which amalgamated purchase constraint to select. Other data may be reviewed such as by selection of additional data buttons (17) which may include a 12 month trend button or perhaps even a recap button as shown in FIG. 3. An example of a 12 month trend display is shown in FIG. 22 and an example of a recap data display is shown in FIG. 23. An amalgamated purchase constraint may be selected by clicking on an amalgamated purchase constraint selector element (5) as shown in FIG. 2. Examples of a purchase constraint selector element may include buttons in a display such as but not limited to current, prior 1, prior 2, current average, archive 1, archive 2, archive 3, archive average, and the like. Once selected, a system may automatically allocate purchase recommendations (6) in an automatic purchase recommendation display (7) for the inventory items perhaps based on the amalgamated purchase constraint. A purchase recommendation may include a percentage mixture of inventory items and perhaps even the number of items to order such as in cases or units or the like. An automatic purchase recommendation display may include an inventory item list (19), a purchase recommendation (6), inventory data (12), and the like as may be understood from FIG. 2.

Significant to a buying decision, days of inventory (the "Day" button) and deal order (the "Deal" button) can be selected to constrain the options as desired. For example, using the "deal" button, a set deal size such as vendors often offer can be entered (600 in this example) to provide a total order of 600 cases for a pricing break. From this, an appropriate mix of products can be determined (in this case, 201 cases of "Bud Suitcase" and the like). As a result of this order post-order conditions can also be displayed, such as resulting days of inventory or the like (e.g., after purchase, 52 days if inventory may exist for the "Bud Suitcase" item). As an alternative to a deal size, days of inventory can be set as the constraining factor via button shown. Round off to integer ordering can also be included in the results displayed. [Note that the total quantity ordered, shown as 596 in FIG. 2, is in error on this display due to round off errors; this would be altered in a final product.] Accordingly, a user may now enter an order number in an order number entry portal (15) perhaps based on the deal is offered by a salesperson. In a liquor store environment, it may be desirable to enter an order number by number of cases or perhaps even by number of units. Accordingly, in embodiments to recalculate the data in a buying report display, a button (98) may be provided in order to allow switching between units and cases as can be understood from FIG. 3. A system may then calculate a purchase recommendation based on an amalgamated purchase constraint and an order number. The amalgamated purchase constraint and order number may be selected and calculated to provide a purchase recommendation for concurrent expiration of stock of the inventory items. Remarkably, a purchase recommendation and the like as discussed above, can be rapidly allocated and generated—perhaps even in a few nanoseconds—which gives a user a significant advantage when having to decide a purchase order in a short amount of time perhaps even during a sales call.

In some embodiments, an inventory item information entry portal (21) may be included in a display. An inventory item information entry portal may allow a user to enter new information related to an inventory item which may even include a pricing information entry portal to enter new inventory item pricing information. New pricing information may include but is not limited to cost, retail price, and the like. These may be entered into a cost information entry portal and perhaps even a retail price information entry portal as can be understood from FIG. 2. A system may then calculate a gross margin percentage from the new pricing information such as with an automatic calculator element. In addition, a display may include historical pricing information, such as cost, retail price, and percentage gross margin in order as may be understood from FIG. 2.

Figure 4:
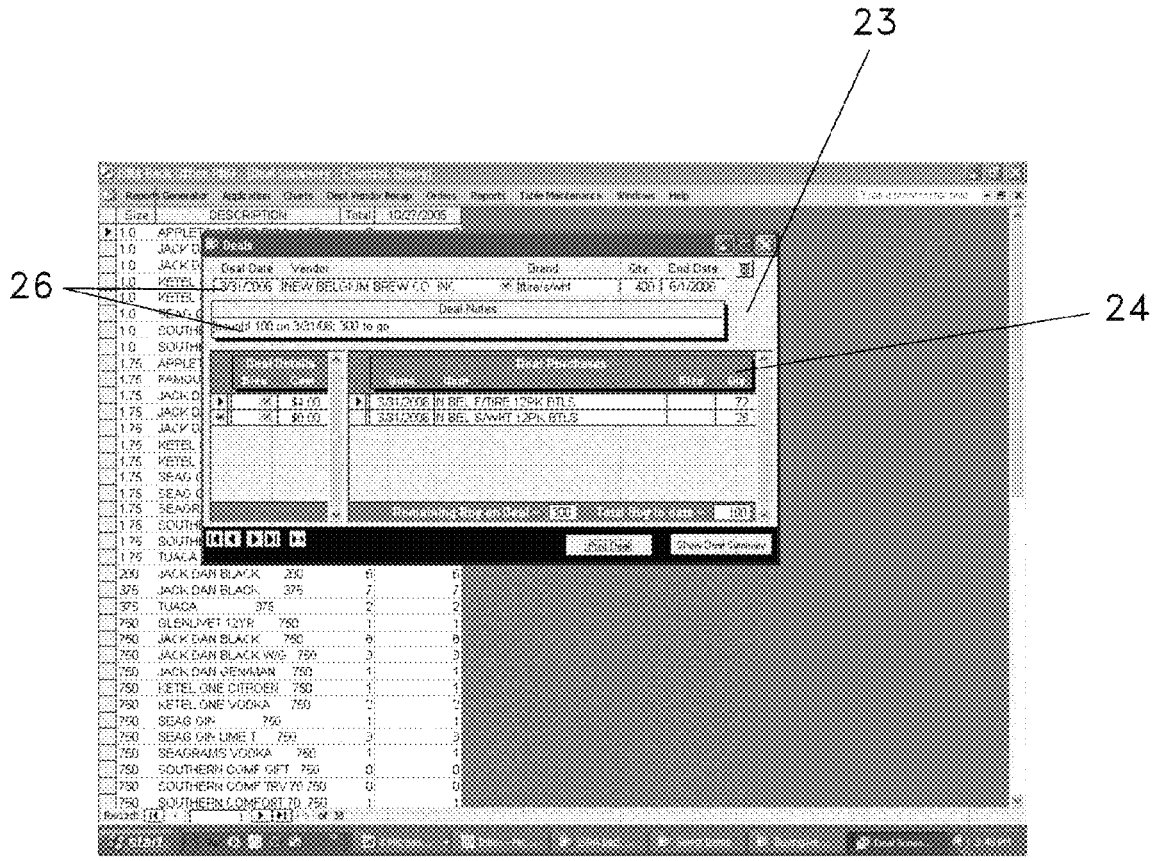
Figure 5:
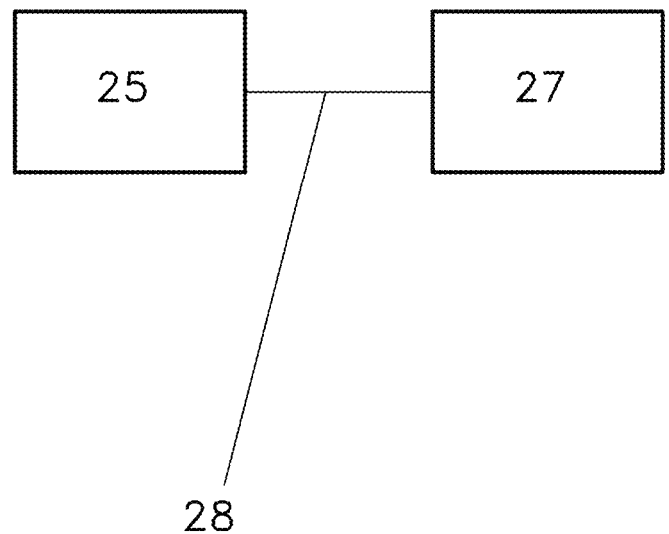
FIG. 5 illustrates schematically one design of an embodiment of the system relating to linking of displays at both an apparatus and functional level.

In some situations, even though a deal has been made (for example, a commitment to buy a certain number of cases of three particular types of liquor over a period of time), it may not be of economic sense to purchase and store the entire deal amount. Therefore, partial shipments of a deal may be made within the agreed period of time and in some instances several shipments of inventory items may be made before the agreed deal is completed. However, it may be desirable to keep track of each partial order to ensure that the deal is accurately maintained. Accordingly, embodiments may include a system having a cumulative deal tracking display (23) where a user can enter an inventory item purchase (24), deal information, terms or the like into a deal term entry portal (26) as shown in FIG. 4. This may provide a tracking feature of inventory item purchases. A cumulative deal tracking display may include but is not limited to a list of all deals, remaining buy on at least one deal, total deal purchase amount to date, deal details, costs of a deal, deal notes, deal end date, deal date, quantity of deal, deal purchases, size, or the like. Of course, a cumulative deal tracking display (25) may be linked (28) to an inventory item display (27) such as a buying report display as schematically represented in FIG. 5. After entering a new deal purchase into a cumulative deal tracking display, a "post deal" button may be selected to achieve storage of the deal information. In addition, summaries of deal information may be displayed in a cumulative deal tracking display.

Figure 19:
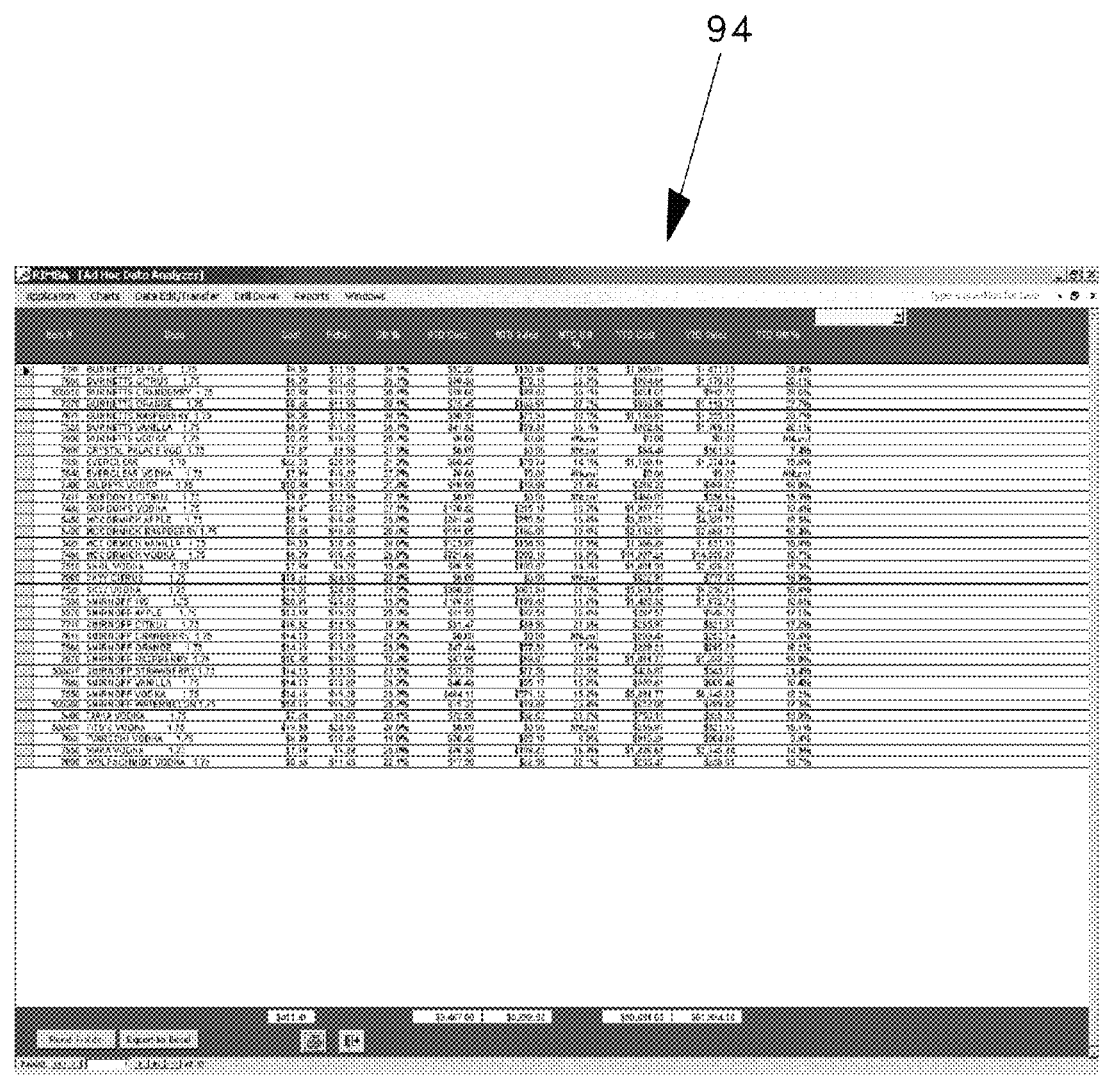

Referring back to FIG. 15, it can be recalled that an ad hoc report can be generated with one click. Once entered, an ad hoc report (94) with information such as shown in FIG. 19 (this example is for all vodkas) may be displayed. This embodiment can provide an output or report generation on a one shot or perhaps even ad hoc basis without external programmer/programming interventions or skills necessary. The ad hoc aspect is both a broad concept and also a software tool through which the invention may provide for spontaneous user output and reporting. For example, system established table names and field names with relative field properties (column headings, column width, decimal places, numeric format, etc) may be captured and made available for the user (and these properties can be managed by the user apart from system table requirements). Additionally calculated fields can be created by users. Calculated fields can even be user-described field names and previously established properties that can call any known system defined field(s) and perform normal calculations or analysis upon them. Calculated fields can further combine normal arithmetic and algebraic equations in conjunction with these system defined fields to achieve a desired outcome. Again, this can be accomplished through a simple, user-friendly interface to present system established and calculated fields for extemporaneous user layouts. Layouts can further be detailed, filtered, grouped and sorted according to user specifications and needs at initial definition or upon recalling saved layouts. Importantly, while user-specified configuration is possible this can be set to a starting point or default arrangement and thus avoided or it may even be set once and recalled for the next event for simplicity. As but one example, a display such as shown in FIG. 19 can illustrate a department's totals, and each product's performance such as its gross margin prediction based on price and its actual performance, shown as YTD or MTD (month to date) GM % value (e.g., factoring in coupons, discounts, or the like). In this manner systematic or product performance flaws or inconsistencies can be easily identified and appropriate steps taken to alter the business and enhance profitability. For example, in the illustration shown, it can be seen that while the Burnetts Apple product is achieving nearly its desired 30.1% margin, the Gilbey's Vodka may be underperforming by achieving only 18.0% as opposed to its desired 27.1% margin.

Figure 17:
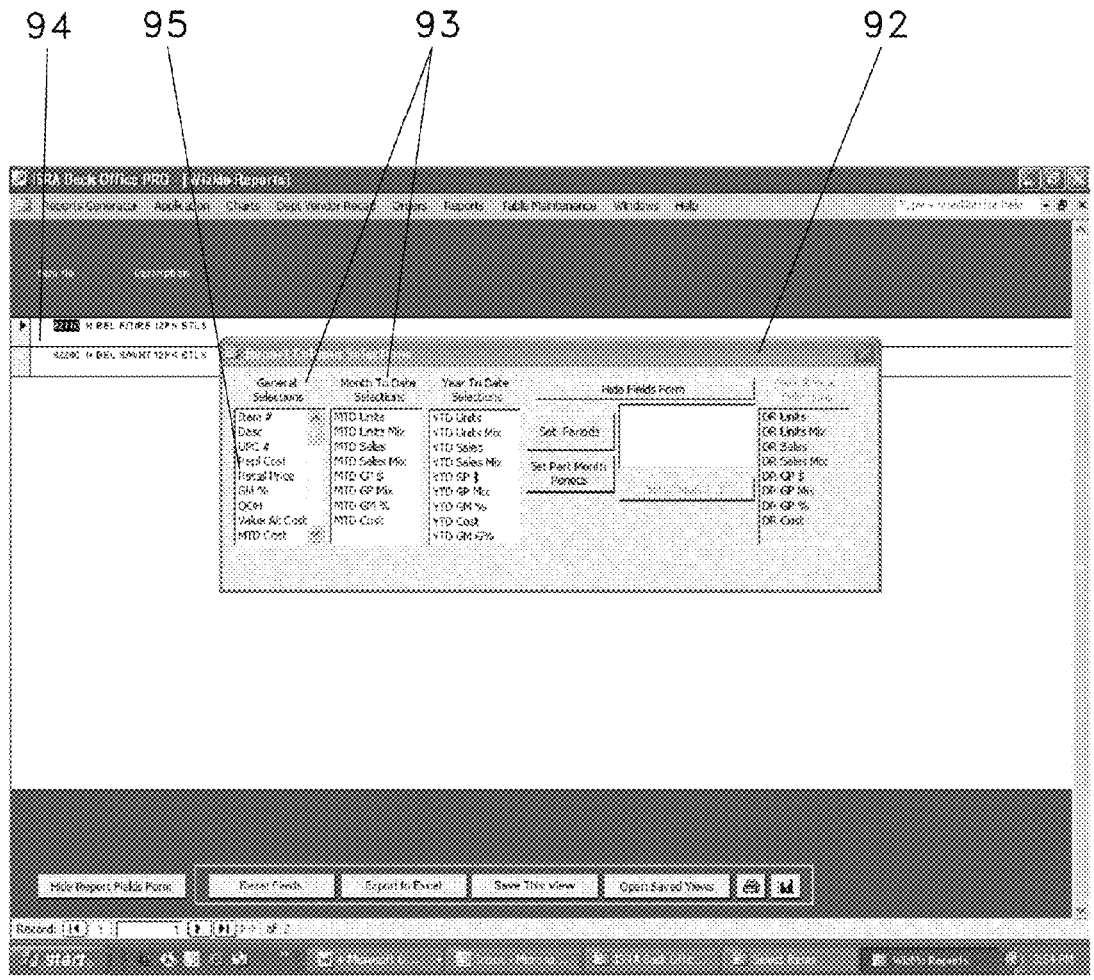
Figure 18:
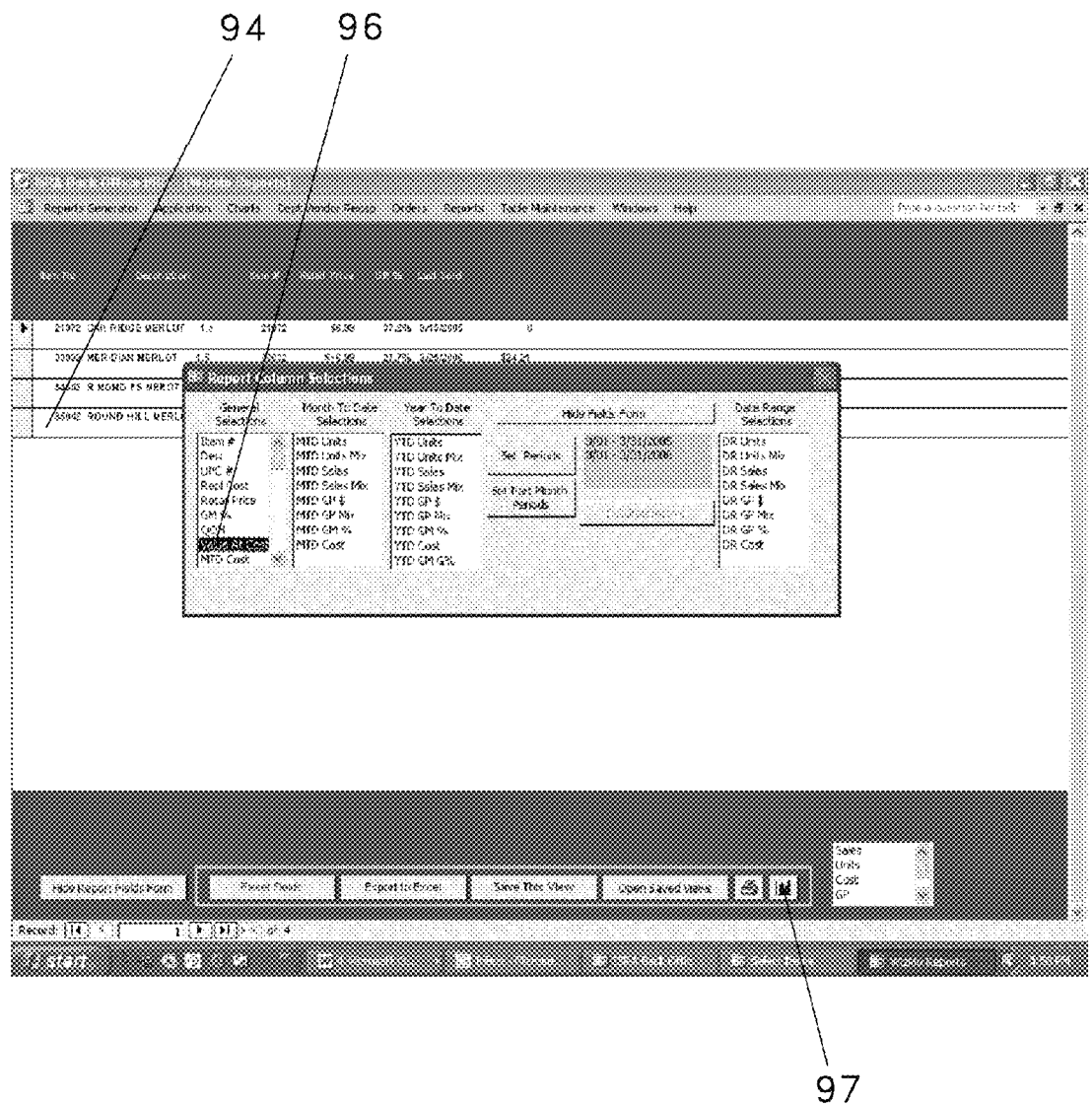
FIG. 18 is an alternative example of FIG. 17 of one screen display that illustrates both the functionality and elements through which an embodiment of the system can create an "Ad Hoc" report.

In this respect, and as shown in FIGS. 17 and 18, the present invention may allow easy ad hoc reporting of at least one selected inventory item perhaps from an inventory category selection display as discussed above. When an ad hoc report with information such as shown in FIG. 19 is created, an ad hoc reporting category selection display (92) may automatically appear. A report may then be responsive to selected items (96) in an ad hoc reporting category selection display. An ad hoc reporting category selection display may list various categories (93) including but not limited to general selections, month to date selections, year to date selections, set time periods, date range selections, reporting information, and the like. At least one item (95) in a category may be selected of which a report may be generated. Items may include but are not limited to item number, description, UPC number, replacement cost, retail price, gross margin percentage, quantity on hand, value at cost, month to date cost, case quantity, unit type, unit size, pack size, on order, category, style/type, region, country, month to date units, month to date units mix, month to date sales, month to date sales mix, month to date gross profit in dollars, month to date gross profit mix, month to date gross margin percentage, month to date cost, year to date units, year to date units mix, year to date sales, year to date sales mix, year to date gross profit in dollars, year to date gross profit mix, year to date gross margin percentage, year to date cost, or the like. In addition, embodiments may include a date selection option in an ad hoc reporting category selection display. This may allow a report to be generated based on a selected time period as may be understood from FIG. 18 as well as from the discussion of the calendar functions above. A system may search a database to retrieve data of a selected item (96) and a report may include the retrieved inventory item data. Of course, in embodiments, at least one additional item may be selected from an ad hoc reporting category selection display and the related inventory item data may then be added to the report. Once the report is generated, it may be stored in a computer storage element, downloaded, printed, exported to another program (such as a Word document or an Excel document, etc.), transferred, or the like. In other embodiments, a stored report may be retrieved by selection of a report retrieval button or the like. Further, reports or even report formats may be retrieved for assistance in efficient creation of new reports. For example, use of previously selected item(s) (95) in an old report may be used with a new set of inventory items to create a new report. In addition, a graphing feature (97) may be provided in an ad hoc report or even in an ad hoc reporting category selection display such as shown in FIG. 18.

Figure 21:
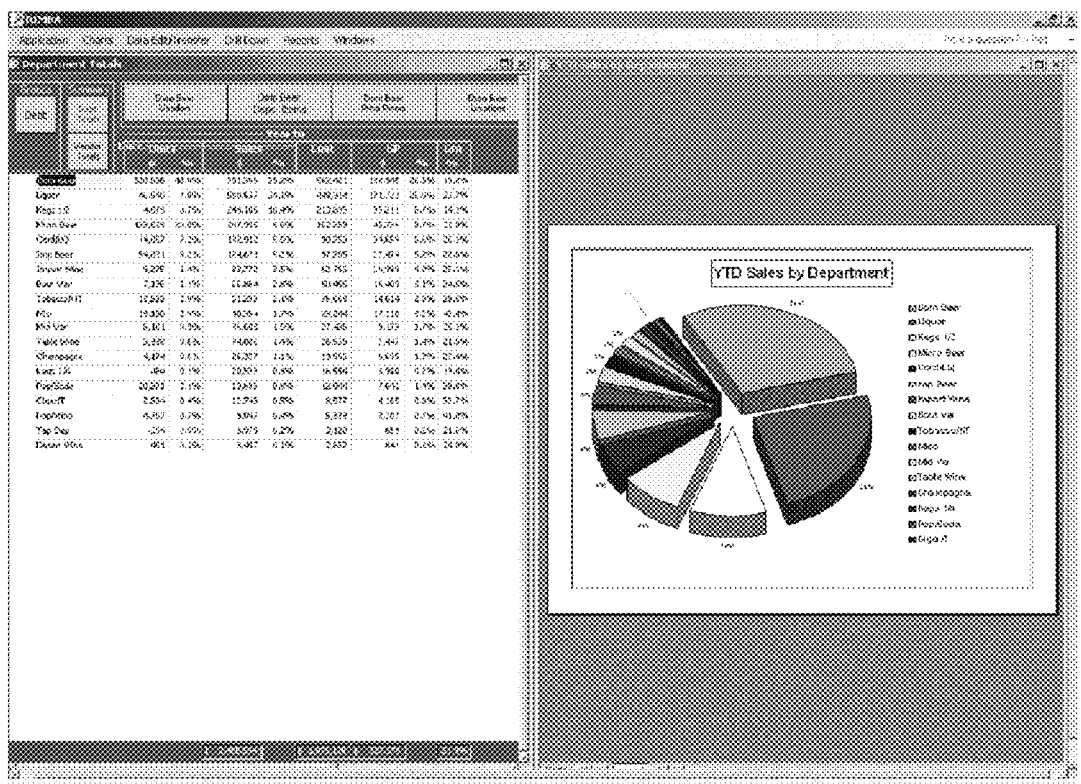

Referring back to FIG. 15, it can be noticed that a "Drill Down" function (155) can be included. With one click a report (156) with information such as shown in FIG. 21 (this example is for all domestic beers) may be displayed. Similarly a drill down report by vendor can be accomplished. These embodiments can provide an output or report in both table and charted formats. As shown, the table can show products or vendors with automatic ranking from top percentage of sales or the like. In other embodiments, sales and other data can be grouped for a specific period for price point comparison. The user can locate price points generating the highest percentage of sales and gross profit dollars as a quick comparison against other price points that are not producing adequate dollars and profit dollars. Again, with "one click" (even if slightly more than one) the user can view inventory balance on hand as he or she compares the sales, gross profit, gross profit margin or the like within any product or vendor group chosen. The user might even be able to "one click" into a return on investment (ROI) analysis by category, item, department, vendor, etc. This may allow for balancing inventory and properly allocating inventory dollars with the product group chosen.

As mentioned earlier importing of data can occur. Automatic importing of all pertinent data from other POS data collection systems can easily be accomplished for use by this system. Tables and relative relationships can be established and can be simply and perhaps automatically populated with the user data. From that point the retailer can take advantage of all the functions and functionality of this software. Export capabilities can also be provided to allow for mass data changes. Mass changes update, for example, retail price and cost using flat amount, specific amount, percentage change or simply replacing old with new cost and/or price. Changes from ones to thousands can also be included with one click ease if desired. Inventory (current) and archived (historical) files and records may be made available to provide necessary data for calculating, evaluating and generally providing useable information—either separately or in combination (linked).

User friendly pop-up tips and suggestions for the retailer to better understand what the information displayed can tell the retailer and suggestions on possible actions the retailer might take to implement more profitable business practices can also be included. For example, as shown in FIG. 2, it can be seen that the per day sales of many products, and in particular the Bud Suitcase product may be off. Notice sales of a year ago were at 5.88 cases/day whereas current sales are at only 4.72 cases/day. Such items can be highlighted to the user and automatic suggestions may even pop up if desired.

As mentioned earlier, an embodiment of the invention can address the fact that for some businesses the percentage sales mix of any product group being purchased may be constantly changing. Often, these changes are not readily seen or anticipated unless visually and quantitatively displayed. In one embodiment, the invention can provide a method to simplistically assess and then even quantitatively display such changes on a real time basis by utilizing the data collected through a separate or associated POS data collection system. In a computer embodiment, this function may be accomplished through software. This software may allow the retailer to look at any current period and perhaps even any like historical period (i.e. same day, same month, same quarter like period) from a previous or other year.

Figure 9:
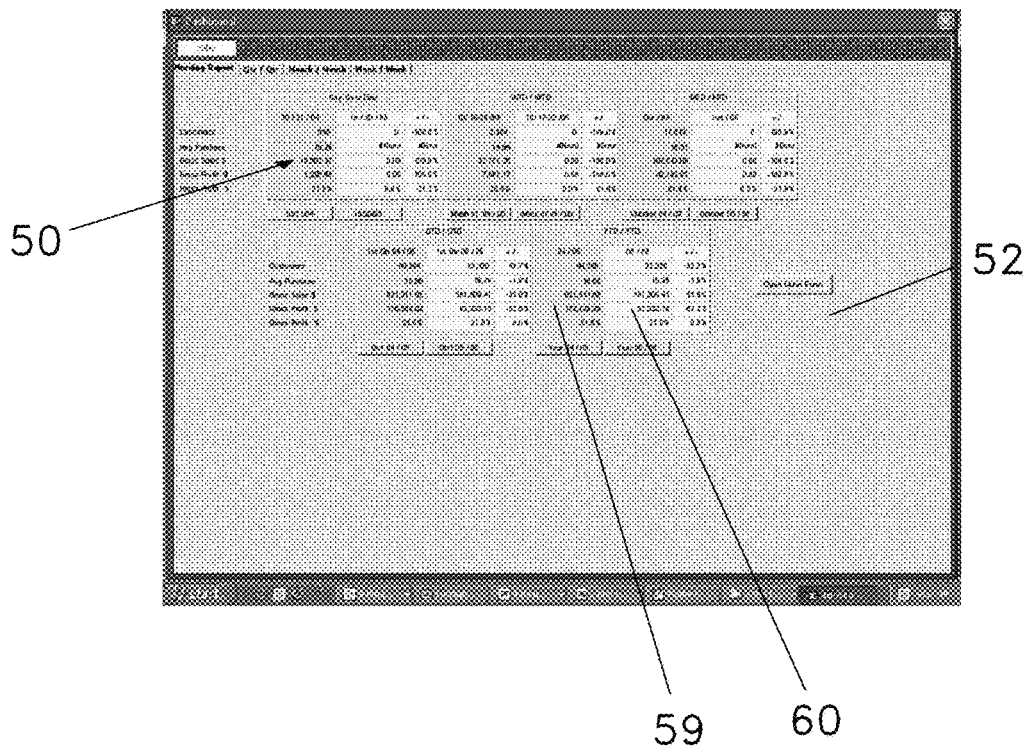

In other embodiments, it may be desirable to provide a system which may allow a simplistic assessment and even a quantitatively display of a business summary. In a computer embodiment, this function may be accomplished through a business software system. It may also be desirable to provide systems which may automatically evoke a user to review business information. In embodiments, a system may automatically facilitate regular debut of initial suggested industry tied information. As such, initial suggested industry tied information may be presented in a morning report. Initial suggested industry tied information may include but is not limited to business performance information, analytical data, or the like of which a system may be configured to present or even automatically configured to present such information in a routinely displayed manner. It may be desirable to select initial suggested industry tied information as both readily assimilatable and particularly appropriate for initial analysis in a display perhaps even a morning report display. To clarify, a display (52) may be a morning report display, a business trend display, or the like displays. Further, a display of initial suggested industry tied information may include condensed business performance information perhaps even various analytical data presented in an easily comprehendible and simplistic manner. As may be understood from FIG. 9, a display (52) may include initial suggested industry tied information (50) relating to historical analytical data (59) and even recent analytical data (60). Analytical data may include, but is certainly not limited to, number of customers, average purchase, gross sales, gross profits, gross profit percentage, comparison of data to previous day, comparison of data to previous month, comparison of data to previous week, comparison of data to previous month, comparison of data to previous quarter, comparison of data to previous year, comparison of number of customers to previous day, comparison of average purchase to previous day, comparison of gross sales to previous day, comparison of gross profits to previous day, comparison of gross profit percentage to previous day, comparison of number of customers to previous week, comparison of average purchase to previous week, comparison of gross sales to previous week, comparison of gross profits to previous week, comparison of gross profit percentage to previous week, comparison of number of customers to previous month, comparison of average purchase to previous month, comparison of gross sales to previous month, comparison of gross profits to previous month, comparison of gross profit percentage to previous month, comparison of number of customers to previous quarter, comparison of average purchase to previous day, comparison of gross sales to previous quarter, comparison of gross profits to previous quarter, comparison of gross profit percentage to previous quarter, comparison of number of customers to previous year, comparison of average purchase to previous year, comparison of gross sales to previous year, comparison of gross profits to previous year, comparison of gross profit percentage to previous year, or the like data. Links to noted events perhaps via a note button may be provided in a morning report display or the like, such noted events are further discussed herein.

Figure 11:
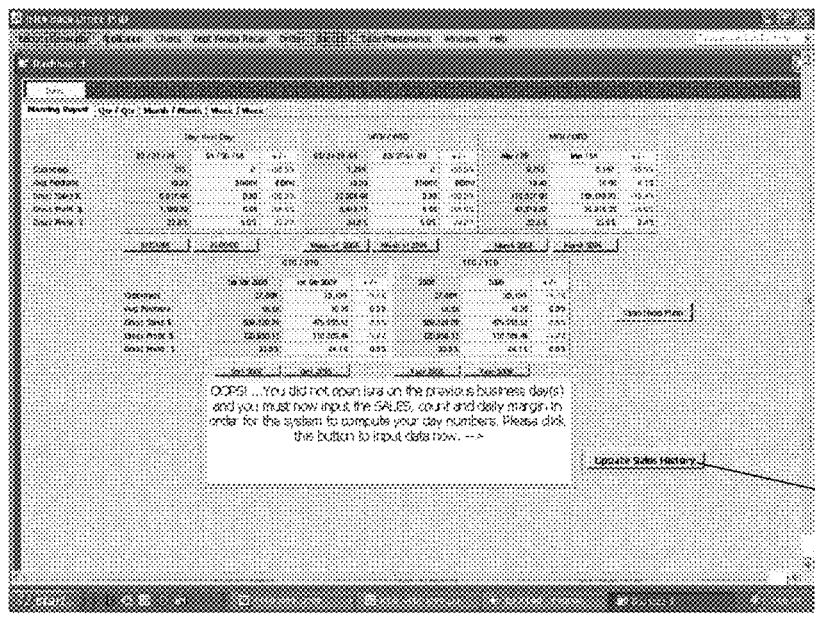
FIG. 11 is an alternative example of FIG. 9 of one screen display that illustrates a morning report functionality and elements.

An automatic facilitator of regular debut of initial suggested industry tied information may include a highly facilitated regular debut of initial suggested industry tied information. This may include a system which provides an automatic analytical data update element in order to automatically update information perhaps business performance information, analytical data, or the like, to present current data to a user perhaps even without a user's input. As a system may update such information, it may utilize at least one software algorithm to calculate updated analytical data and may even automatically store this updated data in a database perhaps with use of a computer storage element. For example, the present invention may link a system to recent analytical data such as a point-of-sale system. Such linking may assist in an update operation. In one embodiment, an update sales history button (55), as may be understood from FIG. 11, may be provided in a morning report display in order to ensure review of current information.

Figure 10:
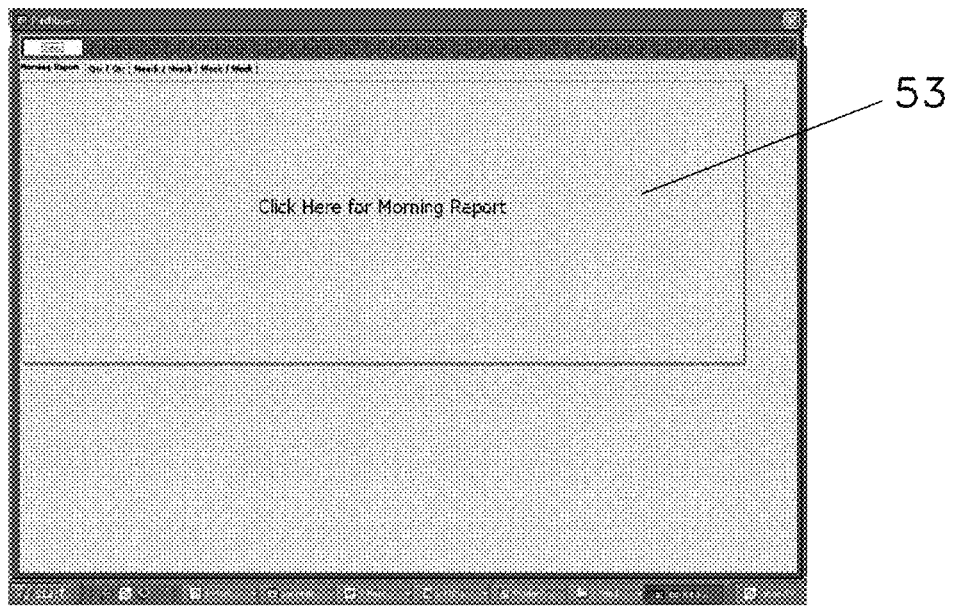
FIG. 10 is an example of one screen display that illustrates an enticement functionality and element.

In addition, highly facilitated regular debut of initial suggested industry tied information may include assisting a user to review such information. Embodiments may include enticing review of information perhaps with a display review enticement element (53), one example as shown in FIG. 10 in a "click here for morning report" link. As such, this enticement may include displaying—or perhaps even clearly displaying—a morning report button which may be linked to initial suggested industry tied information. Such enticement may include, in other embodiments, prompting a user to review industry tied information. In yet other embodiments, an automatic display of initial suggested industry tied information may automatically appear or may even automatically prompt a user to review a display of initial suggested industry tied information when a user logs on to a system, starts up a computer system, or the like. This may be achieved by "pop up" function, as those skilled in the art would understand. Enticement may also include automatically and frequently displaying or even prompting review of initial suggested industry tied information throughout a system. Prompting such as with a morning report button may entice a user to select a morning report button in order to display initial suggested industry tied information. It is noted that review of initial suggested industry tied information maybe non-mandatory so a user may choose to dismiss any review.

A system may present, in embodiments, a summarization of the operations of business which can monitor business performance and provide simplistic assessment. Again, in a computer embodiment, this function may be accomplished through a business software system. A system may automatically present business performance data (65) and perhaps may even disparate substantially redundant business performance data (67) in at least one business performance display (66) as may be understood from FIGS. 12, 13, and 14. This display may facilitate comparison of the business performance data and disparate substantially redundant business performance data. Such comparison may be between the two types of data or perhaps may even within each type of data. In a computer embodiment, this function may be accomplished through a business software system. Business performance data and perhaps disparate substantially redundant business performance data may be automatically presented at initial startup of a computer system. Links to noted events perhaps via a note button may be provided in a in at least one business performance display or the like, such noted events are further discussed herein.

Figure 12:
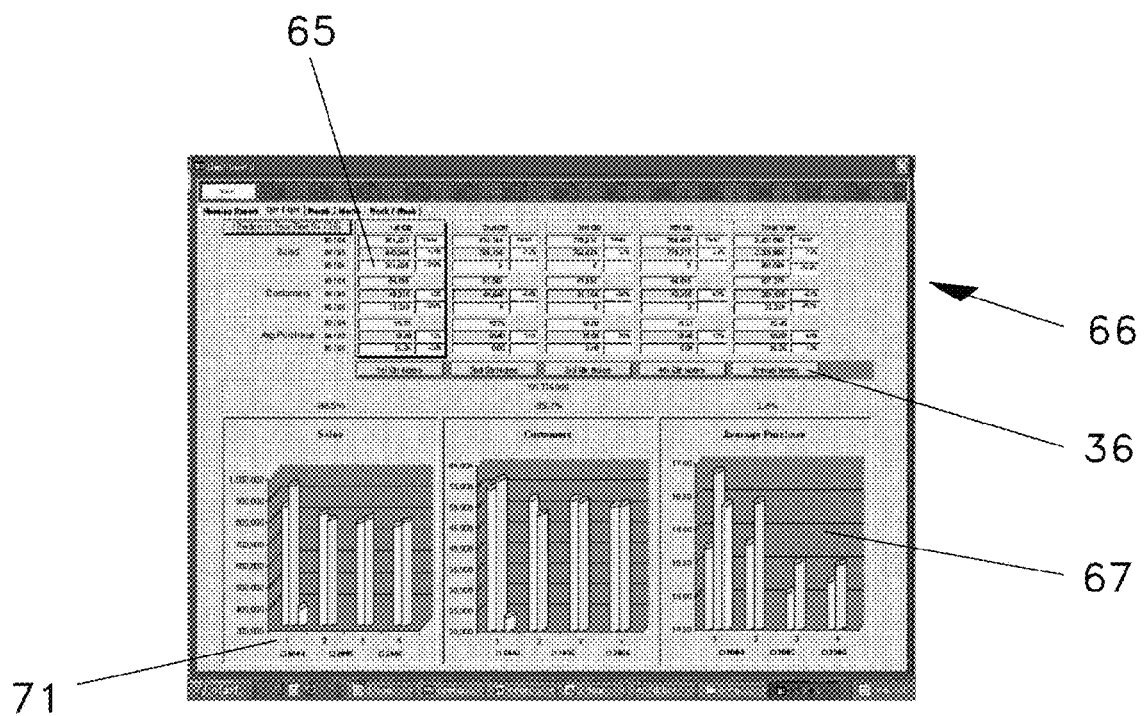
Figure 13:
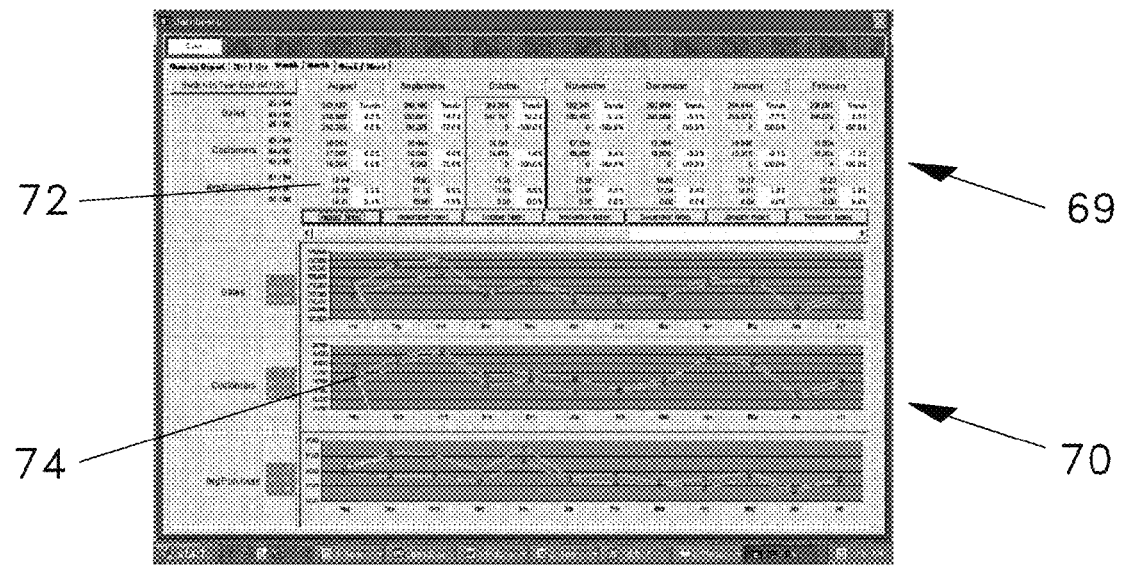
Figure 14:
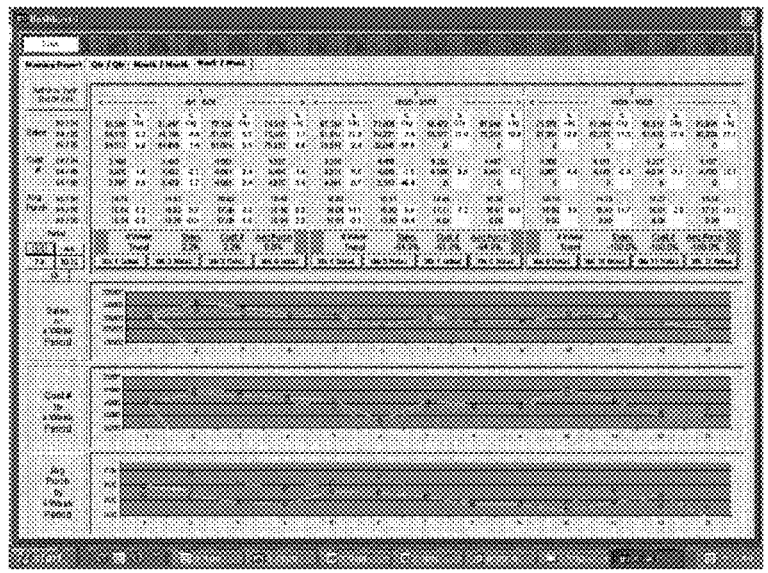

Business performance data and even disparate substantially redundant business performance data may include, but is not limited to, sales information and multitrend business performance data (74) such as perhaps, sales data, customer data, average purchase data, or the like data related to business performance. A business performance display(s) may include but is not limited to a yearly report, a quarter report, a monthly report, a weekly report, or the like. As such, in one example, yearly business performance data (71) may be presented in at least one business performance display. This display may help in an understanding of how the business is performing. Disparate substantially redundant business performance data may be visually presented in a visual representation perhaps different from the business performance data. For example, a table (69) of business performance data which may include analytical data may be presented, and disparate substantially redundant performance data may be presented in a graph, such as shown in FIGS. 12, 13, and 14. A graph (70) may allow presentation of disparate substantially redundant business performance data in an easily comprehensible format. As one skilled in art would understand, a graph may include but is not limited to, a bar graph, a line graph, a pie chart, a chart, a column chart, a scatter chart, and the like. For example, as shown in FIG. 12, business performance data (65) may be presented in a table (69) having numeric information of quarterly data and total year data from each of the years of 2004, 2005, and 2006 and disparate substantially redundant business performance data (67) may be presented in a bar graph having quarterly data from each of the years for 2004, 2005, and 2006. A display having data presented in both a table format and a graph format may provide a user an invaluable presentation of the business performance. In particular, disparate substantially redundant business performance data presented in a graph (70) may provide easy and quick interpretation of the business simply based on its format. Then if more details are needed, review of a table may be appropriate.

Accordingly, some embodiments may provide a system displaying a confidence of business performance data and substantially redundant business performance data in a visual confidence display (75), one example as shown in FIG. 14. In other embodiments, a visual confidence display may include current substantially redundant business performance data compared with historical data in a data variability display. An appropriate time scale may be selected to present a time scale comparison of business performance data. A time scale comparison, as may be represented in FIGS. 12, 13, and 14, may include previous yearly data compared to current year data in a quarterly, monthly, or perhaps even weekly fashion. In embodiments, partial presentation (72) of business performance data may be viewed in a display such as shown in FIG. 13. Since business performance data may be presented in a table format, all of the data may not simplistically fit in a display. However, partial presentation of data may allow complete review of business performance data while still providing the option of scrolling through and reviewing the initially unviewed business performance data. Business performance data may be updated perhaps even automatically updated to ensure that the most recent information is presented for review. As discussed herein, business performance data may be updated through a link to a point-of-sale system.

Throughout each of the various embodiments and systems as discussed herein, it may be desirable to record business related observations within a business information system perhaps even a business sales information system. A business related observation recordation system may be an invaluable tool to be used in conjunction with other business information systems. For example, when reviewing a business summary in order to predict upcoming business trends, knowledge of a particular event in an automated fashion may assist in this prediction. In addition, when reviewing business summaries, knowledge of a particular event in an automated fashion may assist in the understanding of certain positive or perhaps even negative trends. Accordingly, the present invention may provide, in embodiments, noting an event associated with business information. In a computer embodiment, this function may be accomplished through a business software system.

An event may be a singular, non-trend, daily event associated with business sales information such as perhaps, on Jul. 4, 2004, a note may read "extremely windy, killed business", and other notes may read "New Year's falls on Saturday this year." In addition, an event may be an irregular event such as an event in a period other than a calendar year, for example a non-calendar year periodicity, or perhaps even a transient event such as an event which lasts only a brief amount of time (for example a clearance sale, advertisement, and the like). An event may be a sporadic and uncontrollable event, a predictable yet unknown timing event, a pseudo clockwork event, or the like. In general, an event may include any notation relating to a particular event such as any event relating to business sales information. For example, an event may include enforcement issues, general events, sporting events, special event, special promotion, traffic events, distribution events, deal events, weather events, sporadic and uncontrollable events, predictable but unknown timing events, pseudo clockwork events, advertising events, employee incentives, or the like.

Figure 7:
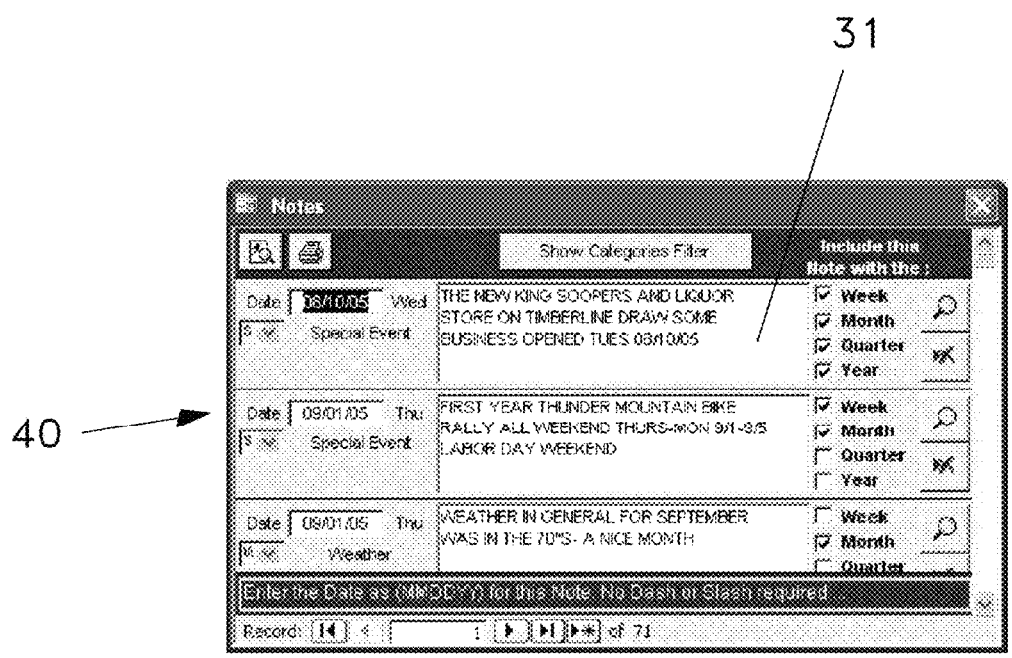

A noted event may be externally entered into at least one noted event entry portal (31) within a business information system. As shown in FIG. 7, a noted event entry portal may be presented in or even linked to a display, perhaps even presented in or linked to a noted event correlation category display (40), a sales information display, or the like of which a user may select such portal. Of course, a noted event entry portal may be found throughout a particular system and may even have multiple noted event entry portals and perhaps even multiple displays. In embodiments, a system may provide a prompt, such as by a button, a link, a pop-up, or the like in order to prompt notation of an event. In embodiments, an externally entered noted event may be one that is user entered and may be not be automatically generated. As such a noted event entry portal may be configured to receive a non-automatically entered noted event. Of course, other embodiments may include automatically generated noted event entries.

Figure 6:
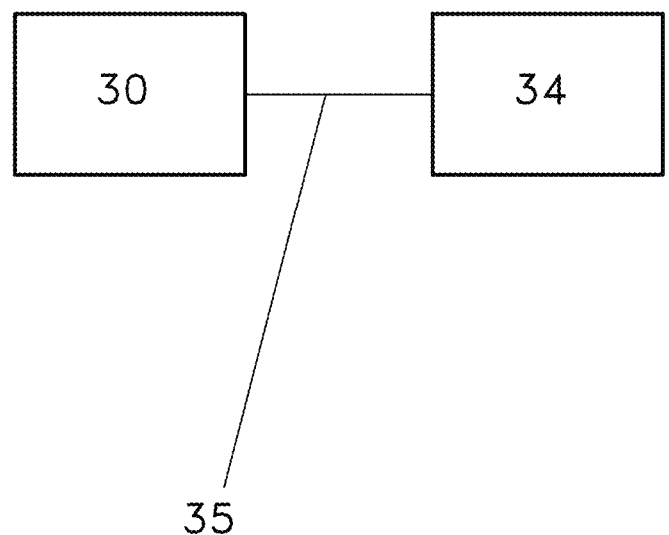
FIG. 6 illustrates schematically one design of an embodiment of the system relating to linking of displays at both an apparatus and functional level.

An event may be automatically correlated with a business information system perhaps with an automatic correlation element. Such automatic correlation may include linking an event with business sales information such as shown in FIG. 6 where a noted event (30) is linked (35) to business sales information (34). A system may provide computer storing of an event perhaps with electronic memory capable of storage of such an event. To allow retrieval of a noted event, an embodiment may make an event computer accessible within a system, for example, with at least one noted event retrieval element such as via a note retrieval display (36) as may be understood in FIG. 12. A note retrieval display may be presented in a system as a display, a noted event correlation category display, a button, a pop-up, or the like and may even be correlated with first quarter notes, second quarter notes, third quarter notes, fourth quarter notes, annual notes, monthly notes, quarterly notes, weekly notes, and the like. FIG. 12 gives an example of an event that may be packaged with sales data in a system, namely quarterly and annual notes are presented here. Of course, many other options may exist. A link may relate a noted event to any part of a system, perhaps business sales information, however linking of a noted event may include a link to a note retrieval display, an event correlation category, and the like. Box 34 of FIG. 6 is meant to represent all possible links.

Figure 8:
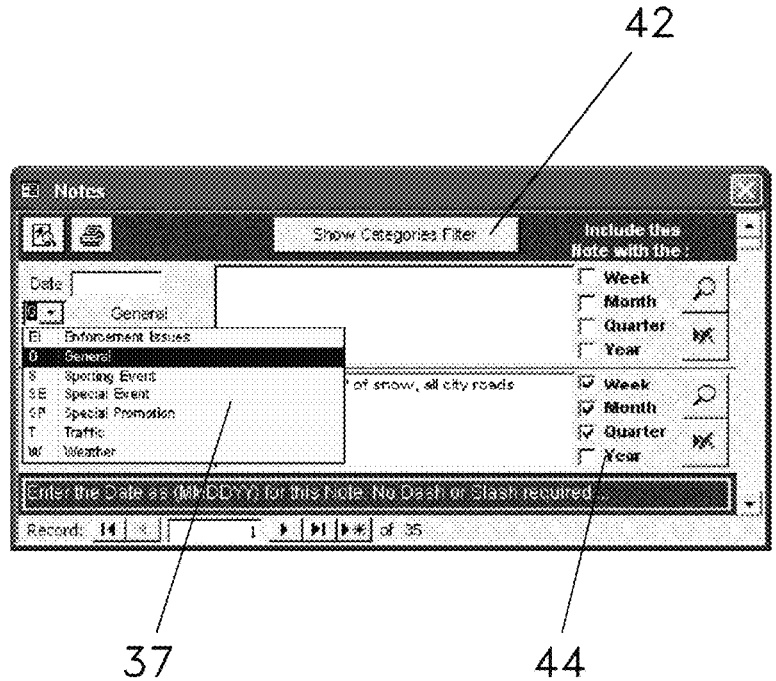

When entering an event into a noted event entry portal, embodiments may provide at least one event category for selection. As shown in FIG. 8 and in various embodiments, a noted event correlation category display (40) may have an event category (37) listing, perhaps even at least one noted event correlation category (44) in a listing, and perhaps even an event category filter (42) for selection. When entering a noted event, a user may select an appropriate event category to associate with the event. This may allow grouping or perhaps even linking of events within a system. An event category may include but is not limited to enforcement issues, general, sporting event, special event, special promotion, traffic, distribution, deals, weather, or the like. As shown in FIG. 8 the "G" general category has been selected. A noted event correlation category may include year, quarter, month, week, or the like. As can be understood from the discussion above, an event may be linked with at least one noted event correlation category where a noted event correlation category may be displayed within the system. The noted event correlation category may then be selected to view a correlated event. An event category filter may provide filtering a retrieved event with an event category, for example when retrieving a noted event, it may be desirable to view only those traffic related events or the like. This may be achieved with an event category filter.

As envisioned, the entire computerized application is expected to be provided as self-contained code for use at the desktop computer level with or without a separate POS software. This software may also be packaged and deployed to be run on a given desktop computer without any further software requirements and without internal IT involvement.

As can be easily understood from the foregoing, the basic concepts of the present invention may be embodied in a variety of ways. It involves both business management techniques as well as devices to accomplish the appropriate business management. In this application, the business management techniques are disclosed as part of the results shown to be achieved by the various devices and programs described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that are included or may be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates.

Regarding this last aspect, as but one example, the disclosure of a "display" should be understood to encompass disclosure of the act of "displaying"—whether explicitly discussed or not—and, conversely, were there effectively disclosure of the act of "displaying", such a disclosure should be understood to encompass disclosure of a "display" and even a "means for displaying." Such changes and alternative terms are to be understood to be explicitly included in the description.

Any acts of law, statutes, regulations, or rules mentioned in this application for patent; or patents, publications, or other references mentioned in this application for patent are hereby incorporated by reference. Any priority case is also hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in any information disclosure statement filed with the application are hereby appended and hereby incorporated by reference, however, as to each of the above, to the extent that such information or statements incorporated by reference might be considered inconsistent with the patenting of this inventions such statements are expressly not to be considered as made by the applicants.

Thus, the applicants should be understood to have support to claim and make a statement of invention to at least: i) each of the business management devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

In addition and as to computer aspects and each aspect amenable to programming or other electronic automation, the applicants should be understood to have support to claim and make a statement of invention to at least: xiii) processes performed with the aid of or on a computer as described throughout the above discussion, xiv) a programmable apparatus as described throughout the above discussion, xv) a computer readable memory encoded with data to direct a computer comprising means or elements which function as described throughout the above discussion, xvi) a computer configured as herein disclosed and described, xvii) individual or combined subroutines and programs as herein disclosed and described, xviii) the related methods disclosed and described, xix) similar, equivalent, and even implicit variations of each of these systems and methods, xx) those alternative designs which accomplish each of the functions shown as are disclosed and described, xxi) those alternative designs and methods which accomplish each of the functions shown as are implicit to accomplish that which is disclosed and described, xxii) each feature, component, and step shown as separate and independent inventions, and xxiii) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. An intelligent product allocation facilitator device for product purchasing recommendations based on spontaneous spur of the moment supplier incentives comprising:

an intelligent product allocation facilitator device comprising a processor capable of executing subroutines in an automated business information system, said processor configured to:

receive point-of-sale data information into said intelligent product allocation facilitator device;

calculate and automatically display initial suggested industry tied information each time said automated business information system is used;

wherein said initial suggested industry tied information comprises a business performance display of business performance data together with disparate redundant business performance data;

display a one-click calendar display;

receive user input from said one-click calendar display of a time frame of inventory item data information for a particular purchase decision;

display an inventory category selection display with a recommended hierarchical categorization of inventory items;

receive user input of at least two selected inventory items from a plurality of inventory items in said inventory category selection display having said recommended hierarchical categorization of inventory items;

display an automatically generated inventory item display of a plurality of user-selected inventory items based on said user input of said selected inventory items and said user input from said one-click calendar display;

wherein said automatically generated inventory item display comprises a display of a current individual store based comparison percentage mixture purchase constraint for said selected inventory items and at least one historical individual store based comparison percentage mixture purchase constraint for said selected inventory items;

receive user input of a selected purchase constraint from one of said purchase constraints in said inventory item display;

display a non-algorithm, spontaneously-based, multiple inventory item grouped deal term user entry portal;

receive user input of a user-entered, non-algorithm, spontaneously-based, multiple inventory item grouped deal term; and display an automatically allocated purchase recommendation based on said user selection of one of said purchase constraints and said user-entered, non-algorithm, spontaneously-based, multiple inventory item grouped deal term;

store, retrieve, and display a user entered singular, non-trend, daily, noted event associated with business sales information;

display events selected from a group consisting of enforcement issues, general, sporting event, special event, special promotion, traffic, distribution, deals, and weather;

receive user input for cumulative deal tracking information and display said cumulative deal tracking information; and receive purchase deal term entries from a user and display cumulative deal tracking.

2. An intelligent product allocation facilitator device for product purchasing recommendations based on spontaneous spur of the moment supplier incentives according to claim 1 wherein said processor is further configured to display a review enticement element within said intelligent product allocation facilitator device.

3. An intelligent product allocation facilitator device for product purchasing recommendations based on spontaneous spur of the moment supplier incentives according to claim 1 wherein said initial suggested industry tied information comprises a display of a table of said business performance data and a graph of said disparate redundant business performance data.

4. An intelligent product allocation facilitator device for product purchasing recommendations based on spontaneous spur of the moment supplier incentives according to claim 1 wherein said initial suggested industry tied information comprises a display of multitrend business performance data selected from the group consisting of sales data, customer data, and average purchase data.

5. An intelligent product allocation facilitator device for product purchasing recommendations based on spontaneous spur of the moment supplier incentives according to claim 1 wherein display said inventory category selection display comprises an alternative description entry portal.

6. An intelligent product allocation facilitator device for product purchasing recommendations based on spontaneous spur of the moment supplier incentives according to claim 1 wherein said display said inventory category selection display with said recommended hierarchical categorization of inventory items comprises display at least one stratum and an inventory item list in said inventory category selection display.

7. An intelligent product allocation facilitator device for product purchasing recommendations based on spontaneous spur of the moment supplier incentives according to claim 1 wherein said processor is further configured to display an ad hoc reporting category selection display based on at least one selected inventory item from said inventory category selection display.

8. An intelligent product allocation facilitator device for product purchasing recommendations based on spontaneous spur of the moment supplier incentives according to claim 7 wherein said display said ad hoc reporting category selection display comprises display a one-click ad hoc report element.

9. An intelligent product allocation facilitator device for product purchasing recommendations based on spontaneous spur of the moment supplier incentives according to claim 8 wherein said display one-click ad hoc report element comprises display a graph display.

10. An intelligent product allocation facilitator device for product purchasing recommendations based on spontaneous spur of the moment supplier incentives according to claim 1 wherein said display one-click calendar display comprises a display of appropriate time frames selected from a group consisting of a day, a week, a month, a year, a range of dates, selected analysis dates, selected start analysis date, selected stop analysis date, suggested analysis dates, suggested start analysis date, suggested stop analysis date, and any combination thereof.

11. An intelligent product allocation facilitator device for product purchasing recommendations based on spontaneous spur of the moment supplier incentives according to claim 8 wherein said display one-click ad hoc report element comprises display a drill down report display.

\* \* \* \* \*